(12) United States Patent
Hotchkies et al.

(10) Patent No.: US 11,457,078 B2
(45) Date of Patent: Sep. 27, 2022

(54) MACHINE LEARNING BASED CONTENT DELIVERY

(71) Applicant: Amazon Technologies, Inc., Seattle, WA (US)

(72) Inventors: Blair Livingstone Hotchkies, Bellevue, WA (US); Bradley Scott Bowman, Seattle, WA (US); Paul Christopher Cerda, Snohomish, WA (US); Min Chong, Kirkland, WA (US); Anthony T. Chor, Bellevue, WA (US); Leo Parker Dirac, Seattle, WA (US); Kevin Andrew Granade, Seattle, WA (US); Udip Pant, Seattle, WA (US); Sean Michael Scott, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/201,883

(22) Filed: Nov. 27, 2018

(65) Prior Publication Data
US 2019/0109926 A1 Apr. 11, 2019

Related U.S. Application Data

(63) Continuation of application No. 14/578,189, filed on Dec. 19, 2014, now Pat. No. 10,225,365.

(51) Int. Cl.
*H04L 29/06* (2006.01)
*H04L 29/08* (2006.01)
(Continued)

(52) U.S. Cl.
CPC ........ *H04L 67/327* (2013.01); *H04L 67/2842* (2013.01); *H04L 67/42* (2013.01)

(58) Field of Classification Search
CPC .... H04L 67/327; H04L 67/2842; H04L 67/42
See application file for complete search history.

(56) References Cited

U.S. PATENT DOCUMENTS 5,649,185 A   7/1997   Antognini et al.
5,664,106 A   9/1997   Caccavale
(Continued)

OTHER PUBLICATIONS

Al-Fares, M. et al., A Scalable, Commodity Data Center Network Architecture, SIGCOMM '08 Proceedings, Aug. 17, 2008, pp. 63-74, 66-68, 70-71, Seattle, WA.
(Continued)

*Primary Examiner* — Glenford J Madamba
(74) *Attorney, Agent, or Firm* — Knobbe Martens Olson & Bear LLP

(57) ABSTRACT

Systems and methods for managing content delivery functionalities based on machine learning models are provided. In one aspect, content requests are routed in accordance with clusters of historical content requests to optimize cache performance. In another aspect, content delivery strategies for responding to content requests are determined based on a model trained on data related to historical content requests. The model may also be used to determine above-the-fold configurations for rendering responses to content requests. In some embodiments, portions of the model can be executed on client computing devices.

20 Claims, 13 Drawing Sheets

(51) Int. Cl.
*H04L 67/63* (2022.01)
*H04L 67/568* (2022.01)
*H04L 67/01* (2022.01)

(56) References Cited

U.S. PATENT DOCUMENTS

| | | |
|---|---|---|
| 5,819,033 A | 10/1998 | Caccavale |
| 5,832,517 A | 11/1998 | Knutsen, II |
| 5,999,636 A | 12/1999 | Juang |
| 6,173,322 B1 | 1/2001 | Hu |
| 6,182,125 B1 | 1/2001 | Borella et al. |
| 6,185,598 B1 | 2/2001 | Farber et al. |
| 6,243,761 B1 | 6/2001 | Mogul et al. |
| 6,377,257 B1 | 4/2002 | Borrel et al. |
| 6,438,592 B1 | 8/2002 | Killian |
| 6,473,804 B1 | 10/2002 | Kaiser et al. |
| 6,529,910 B1 | 3/2003 | Fleskes |
| 6,553,419 B1 | 4/2003 | Ram |
| 6,633,324 B2 | 10/2003 | Stephens, Jr. |
| 6,662,233 B1 | 12/2003 | Skarpness et al. |
| 6,697,805 B1 | 2/2004 | Choquier et al. |
| 6,698,013 B1 | 2/2004 | Bertero et al. |
| 6,714,975 B1 | 3/2004 | Aggarwal et al. |
| 6,820,133 B1 | 11/2004 | Grove et al. |
| 6,920,498 B1 | 7/2005 | Gourlay et al. |
| 6,978,418 B1 | 12/2005 | Bain et al. |
| 7,009,943 B2 | 3/2006 | O'Neil |
| 7,065,496 B2 | 6/2006 | Subbloie et al. |
| 7,085,825 B1 | 8/2006 | Pishevar et al. |
| 7,096,193 B1 | 8/2006 | Beaudoin et al. |
| 7,107,273 B2 | 9/2006 | Ohata et al. |
| 7,114,160 B2 | 9/2006 | Suryanarayana et al. |
| 7,120,871 B1 | 10/2006 | Harrington |
| 7,185,084 B2 | 2/2007 | Sirivara et al. |
| 7,269,657 B1 | 9/2007 | Alexander et al. |
| 7,343,399 B2 | 3/2008 | Hayball et al. |
| 7,346,676 B1 | 3/2008 | Swildens et al. |
| 7,373,599 B2 | 5/2008 | McElfresh et al. |
| 7,523,181 B2 | 4/2009 | Swildens et al. |
| 7,555,542 B1 | 6/2009 | Ayers et al. |
| 7,581,224 B2 | 8/2009 | Romero |
| 7,596,150 B1 | 9/2009 | Baird et al. |
| 7,623,460 B2 | 11/2009 | Miyazaki |
| 7,650,376 B1 | 1/2010 | Blumenau |
| 7,653,725 B2 | 1/2010 | Yahiro et al. |
| 7,676,570 B2 | 3/2010 | Levy et al. |
| 7,685,270 B1 | 3/2010 | Vermeulen et al. |
| 7,685,273 B1 | 3/2010 | Anastas et al. |
| 7,698,418 B2 | 4/2010 | Shimada et al. |
| 7,707,071 B2 | 4/2010 | Rigole |
| 7,707,173 B2 | 4/2010 | Nanavati et al. |
| 7,725,658 B2 | 5/2010 | Lang et al. |
| 7,748,005 B2 | 6/2010 | Romero et al. |
| 7,752,301 B1 | 7/2010 | Maiocco et al. |
| 7,756,032 B2 | 7/2010 | Feick et al. |
| 7,765,295 B2 | 7/2010 | Anastas et al. |
| 7,860,735 B2 | 12/2010 | Evanitsky |
| 7,865,594 B1 | 1/2011 | Baumback et al. |
| 7,873,065 B1 | 1/2011 | Mukerji et al. |
| 7,904,875 B2 | 3/2011 | Hegyi |
| 7,925,782 B2 | 4/2011 | Sivasubramanian et al. |
| 7,930,393 B1 | 4/2011 | Baumback et al. |
| 7,933,988 B2 | 4/2011 | Nasuto et al. |
| 7,937,456 B2 | 5/2011 | McGrath |
| 7,961,736 B2 | 6/2011 | Ayyagari |
| 8,051,166 B1 | 11/2011 | Baumback et al. |
| 8,069,231 B2 | 11/2011 | Schran et al. |
| 8,117,306 B1 | 2/2012 | Baumback et al. |
| 8,122,124 B1 | 2/2012 | Baumback et al. |
| 8,165,915 B1 | 4/2012 | Lucash |
| 8,286,176 B1 | 10/2012 | Baumback et al. |
| 8,296,429 B2 | 10/2012 | Baumback et al. |
| 8,316,124 B1 | 11/2012 | Baumback et al. |
| 8,452,870 B2 | 5/2013 | Baumback et al. |
| 8,463,877 B1 | 6/2013 | Richardson |
| 8,468,245 B2 | 6/2013 | Farber et al. |
| 8,489,737 B2 | 7/2013 | Baumback et al. |
| 8,577,963 B2 * | 11/2013 | Trahan ............ H04L 67/02 709/203 |
| 8,667,127 B2 | 3/2014 | Bettis et al. |
| 8,762,526 B2 | 6/2014 | Baumback et al. |
| 8,843,625 B2 | 9/2014 | Baumback et al. |
| 9,071,502 B2 | 6/2015 | Baumback et al. |
| 9,088,460 B2 | 7/2015 | Baumback et al. |
| 9,118,543 B2 | 8/2015 | Baumback et al. |
| 9,160,641 B2 | 10/2015 | Baumback et al. |
| 9,210,099 B2 | 12/2015 | Baumback et al. |
| 9,367,929 B2 | 6/2016 | Bettis et al. |
| 9,491,073 B2 | 11/2016 | Baumback et al. |
| 9,628,403 B2 | 4/2017 | Baumback et al. |
| 9,660,890 B2 | 5/2017 | Baumback et al. |
| 9,769,248 B1 | 9/2017 | Krishnan et al. |
| 9,794,188 B2 | 10/2017 | Baumback et al. |
| 9,825,831 B2 | 11/2017 | Baumback et al. |
| 9,996,501 B1 | 6/2018 | Nelson et al. |
| 10,027,739 B1 | 7/2018 | Krishnan et al. |
| 10,104,009 B2 | 10/2018 | Baumback et al. |
| 10,148,542 B2 | 12/2018 | Baumback et al. |
| 10,205,644 B2 | 2/2019 | Baumback et al. |
| 10,225,365 B1 | 3/2019 | Hotchkies et al. |
| 10,284,446 B2 | 5/2019 | Baumback et al. |
| 10,311,371 B1 | 6/2019 | Hotchkies et al. |
| 10,311,372 B1 | 6/2019 | Hotchkies et al. |
| 10,410,085 B2 | 9/2019 | Bettis et al. |
| 10,462,025 B2 | 10/2019 | Baumback et al. |
| 2001/0034771 A1 | 10/2001 | Hutsch et al. |
| 2002/0016802 A1 | 2/2002 | Hodgkinson |
| 2002/0062372 A1 | 5/2002 | Hong et al. |
| 2002/0073235 A1 | 6/2002 | Chen et al. |
| 2002/0099829 A1 | 7/2002 | Richards et al. |
| 2002/0107913 A1 | 8/2002 | Rivera et al. |
| 2002/0112049 A1 | 8/2002 | Elnozahy et al. |
| 2002/0116491 A1 | 8/2002 | Boyd et al. |
| 2002/0120666 A1 | 8/2002 | Landsman et al. |
| 2002/0135611 A1 | 9/2002 | Deosaran et al. |
| 2002/0138443 A1 | 9/2002 | Schran et al. |
| 2002/0150276 A1 | 10/2002 | Chang |
| 2002/0156884 A1 | 10/2002 | Bertram et al. |
| 2002/0161911 A1 | 10/2002 | Pinckney, III et al. |
| 2002/0165912 A1 | 11/2002 | Wenocur et al. |
| 2002/0194382 A1 | 12/2002 | Kausik et al. |
| 2002/0198963 A1 | 12/2002 | Wu et al. |
| 2003/0005111 A1 | 1/2003 | Allan |
| 2003/0009488 A1 | 1/2003 | Hart, III |
| 2003/0037108 A1 | 2/2003 | Peiffer et al. |
| 2003/0065784 A1 | 4/2003 | Herrod |
| 2003/0118249 A1 | 6/2003 | Edgar |
| 2003/0128233 A1 | 7/2003 | Kasriel |
| 2003/0130982 A1 | 7/2003 | Kasriel |
| 2003/0131106 A1 | 7/2003 | Kasriel |
| 2003/0182305 A1 | 9/2003 | Balva et al. |
| 2003/0182413 A1 | 9/2003 | Allen et al. |
| 2003/0217144 A1 | 11/2003 | Fu et al. |
| 2003/0221000 A1 | 11/2003 | Cherkasova et al. |
| 2003/0236836 A1 | 12/2003 | Borthwick |
| 2004/0039794 A1 | 2/2004 | Biby et al. |
| 2004/0039820 A1 | 2/2004 | Colby et al. |
| 2004/0049541 A1 | 3/2004 | Swahn |
| 2004/0049579 A1 | 3/2004 | Ims et al. |
| 2004/0059796 A1 | 3/2004 | McLintock |
| 2004/0064293 A1 | 4/2004 | Hamilton et al. |
| 2004/0064558 A1 | 4/2004 | Miyake |
| 2004/0128538 A1 | 7/2004 | Gmuender et al. |
| 2004/0194085 A1 | 9/2004 | Beaubien et al. |
| 2004/0199603 A1 | 10/2004 | Tafla et al. |
| 2004/0201669 A1 | 10/2004 | Guha et al. |
| 2004/0221034 A1 | 11/2004 | Kausik et al. |
| 2005/0021862 A1 | 1/2005 | Schroeder et al. |
| 2005/0055420 A1 | 3/2005 | Wyler |
| 2005/0076111 A1 | 4/2005 | Cherkasova et al. |
| 2005/0076339 A1 | 4/2005 | Merril et al. |
| 2005/0086645 A1 | 4/2005 | Diao et al. |
| 2005/0091612 A1 | 4/2005 | Stabb et al. |
| 2005/0102683 A1 | 5/2005 | Branson et al. |

(56) References Cited

U.S. PATENT DOCUMENTS

| | | |
|---|---|---|
| 2005/0182826 A1 | 8/2005 | Knittel et al. |
| 2005/0198571 A1 | 9/2005 | Kramer et al. |
| 2005/0223091 A1 | 10/2005 | Zahavi et al. |
| 2005/0223092 A1 | 10/2005 | Sapiro et al. |
| 2005/0229119 A1 | 10/2005 | Torvinen |
| 2005/0273507 A1 | 12/2005 | Yan et al. |
| 2006/0015865 A1 | 1/2006 | Schneider et al. |
| 2006/0020714 A1 | 1/2006 | Girouard et al. |
| 2006/0026275 A1 | 2/2006 | Gilmour et al. |
| 2006/0048071 A1 | 3/2006 | Jarrett et al. |
| 2006/0059246 A1 | 3/2006 | Grove |
| 2006/0069808 A1 | 3/2006 | Mitchell et al. |
| 2006/0085536 A1 | 4/2006 | Meyer et al. |
| 2006/0179080 A1 | 8/2006 | Meek et al. |
| 2006/0209701 A1 | 9/2006 | Zhang et al. |
| 2006/0218304 A1 | 9/2006 | Mukherjee et al. |
| 2006/0233342 A1 | 10/2006 | Thione et al. |
| 2006/0235961 A1 | 10/2006 | Klein et al. |
| 2006/0251339 A1 | 11/2006 | Gokturk et al. |
| 2006/0265497 A1 | 11/2006 | Ohata et al. |
| 2006/0282758 A1 | 12/2006 | Simons et al. |
| 2007/0016736 A1 | 1/2007 | Takeda et al. |
| 2007/0021998 A1 | 1/2007 | Laithwaite et al. |
| 2007/0050703 A1 | 3/2007 | Lebel |
| 2007/0088805 A1 | 4/2007 | Cyster |
| 2007/0094325 A1 | 4/2007 | Ih et al. |
| 2007/0118640 A1 | 5/2007 | Subramanian et al. |
| 2007/0136469 A1 | 6/2007 | Nusbickel |
| 2007/0143672 A1 | 6/2007 | Lipton et al. |
| 2007/0198982 A1 | 8/2007 | Bolan et al. |
| 2007/0214454 A1 | 9/2007 | Edwards et al. |
| 2007/0219795 A1 | 9/2007 | Park et al. |
| 2007/0226058 A1 | 9/2007 | Lorenzen et al. |
| 2007/0239610 A1 | 10/2007 | Lemelson |
| 2007/0245010 A1 | 10/2007 | Arn et al. |
| 2007/0245299 A1 | 10/2007 | Sung et al. |
| 2007/0250560 A1 | 10/2007 | Wein et al. |
| 2007/0250611 A1 | 10/2007 | Bhogal et al. |
| 2007/0266113 A1* | 11/2007 | Koopmans ........ G06F 16/24552 709/217 |
| 2007/0266151 A1 | 11/2007 | Friedland et al. |
| 2007/0271375 A1 | 11/2007 | Hwang |
| 2007/0299869 A1 | 12/2007 | Clary et al. |
| 2007/0299965 A1 | 12/2007 | Nieh et al. |
| 2007/0300152 A1 | 12/2007 | Baugher |
| 2008/0037432 A1 | 2/2008 | Cohen et al. |
| 2008/0050021 A1 | 2/2008 | Plant |
| 2008/0065724 A1 | 3/2008 | Seed et al. |
| 2008/0065745 A1 | 3/2008 | Leighton et al. |
| 2008/0086559 A1 | 4/2008 | Davis et al. |
| 2008/0098310 A1 | 4/2008 | Choi |
| 2008/0104502 A1 | 5/2008 | Olston |
| 2008/0114875 A1 | 5/2008 | Anastas et al. |
| 2008/0172488 A1 | 7/2008 | Jawahar et al. |
| 2008/0183672 A1 | 7/2008 | Canon et al. |
| 2008/0183721 A1 | 7/2008 | Bhogal et al. |
| 2008/0208961 A1 | 8/2008 | Kim et al. |
| 2008/0215583 A1 | 9/2008 | Gunawardena et al. |
| 2008/0215755 A1 | 9/2008 | Farber et al. |
| 2008/0228574 A1 | 9/2008 | Stewart et al. |
| 2008/0250327 A1 | 10/2008 | Li et al. |
| 2008/0289029 A1 | 11/2008 | Kim et al. |
| 2009/0037517 A1 | 2/2009 | Frei |
| 2009/0055542 A1 | 2/2009 | Zhao et al. |
| 2009/0063690 A1 | 3/2009 | Verthein et al. |
| 2009/0083228 A1 | 3/2009 | Shatz et al. |
| 2009/0083279 A1 | 3/2009 | Hasek |
| 2009/0089448 A1 | 4/2009 | Sze et al. |
| 2009/0119388 A1 | 5/2009 | Kikuchi et al. |
| 2009/0122714 A1 | 5/2009 | Kato |
| 2009/0187575 A1 | 7/2009 | DaCosta |
| 2009/0248786 A1 | 10/2009 | Richardson et al. |
| 2009/0248852 A1 | 10/2009 | Fuhrmann et al. |
| 2009/0248893 A1 | 10/2009 | Richardson et al. |
| 2009/0319636 A1 | 12/2009 | Tokumi |
| 2009/0327460 A1 | 12/2009 | Yoo et al. |
| 2009/0327517 A1 | 12/2009 | Sivasubramanian et al. |
| 2009/0327914 A1 | 12/2009 | Adar et al. |
| 2010/0005403 A1 | 1/2010 | Rozmaryn et al. |
| 2010/0034470 A1 | 2/2010 | Valencia-Campo et al. |
| 2010/0161792 A1 | 6/2010 | Palm et al. |
| 2010/0195908 A1 | 8/2010 | Bechtel et al. |
| 2010/0211459 A1 | 8/2010 | Seeman et al. |
| 2010/0318508 A1 | 12/2010 | Brawer et al. |
| 2010/0325615 A1 | 12/2010 | Ramot |
| 2010/0332650 A1 | 12/2010 | Aisen et al. |
| 2011/0055627 A1 | 3/2011 | Zawacki et al. |
| 2011/0096987 A1 | 4/2011 | Morales et al. |
| 2011/0145715 A1 | 6/2011 | Malloy et al. |
| 2011/0264511 A1 | 10/2011 | Zhang |
| 2012/0042277 A1 | 2/2012 | Lin-Hendel |
| 2012/0164621 A1 | 6/2012 | Katz et al. |
| 2013/0007273 A1 | 1/2013 | Baumback et al. |
| 2013/0031040 A1 | 1/2013 | Modha |
| 2013/0091294 A1 | 4/2013 | El-beltagy et al. |
| 2013/0191450 A1 | 7/2013 | Bodenhamer et al. |
| 2013/0198298 A1 | 8/2013 | Li et al. |
| 2014/0113600 A1 | 4/2014 | El Gamal et al. |
| 2014/0129707 A1 | 5/2014 | Baumback et al. |
| 2014/0135105 A1 | 5/2014 | Quan et al. |
| 2014/0143320 A1 | 5/2014 | Sivasubramanian et al. |
| 2014/0149533 A1* | 5/2014 | Bergman ............ H04L 67/2842 709/213 |
| 2014/0219279 A1 | 8/2014 | Gross et al. |
| 2014/0250051 A1 | 9/2014 | Lahav et al. |
| 2014/0257891 A1 | 9/2014 | Richardson et al. |
| 2014/0304406 A1 | 10/2014 | Baumback et al. |
| 2014/0317726 A1 | 10/2014 | Turgeman et al. |
| 2014/0372511 A1 | 12/2014 | Kapadia et al. |
| 2015/0012649 A1 | 1/2015 | Baumback et al. |
| 2015/0032801 A1 | 1/2015 | Hart |
| 2015/0088968 A1 | 3/2015 | Wei et al. |
| 2015/0156280 A1 | 6/2015 | Vaswani et al. |
| 2015/0189033 A1* | 7/2015 | Han .................... H04L 67/2842 709/203 |
| 2015/0220990 A1 | 8/2015 | Kobyakov et al. |
| 2015/0242379 A1 | 8/2015 | Kuivinen et al. |
| 2015/0263927 A1 | 9/2015 | Baumback et al. |
| 2015/0288593 A1 | 10/2015 | Campbell |
| 2015/0326491 A1 | 11/2015 | Baumback et al. |
| 2015/0333997 A1 | 11/2015 | Mermoud et al. |
| 2015/0358250 A1 | 12/2015 | Baumback et al. |
| 2016/0020972 A1 | 1/2016 | Baumback et al. |
| 2016/0188181 A1 | 6/2016 | Smith |
| 2016/0267354 A1 | 9/2016 | Bettis et al. |
| 2017/0054621 A1 | 2/2017 | Baumback et al. |
| 2017/0070446 A1 | 3/2017 | Baumback et al. |
| 2017/0187591 A1 | 6/2017 | Baumback et al. |
| 2018/0007121 A1 | 1/2018 | Krishnan et al. |
| 2018/0054371 A1 | 2/2018 | Baumback et al. |

OTHER PUBLICATIONS

McCulloch et al. "A Logical Calculus of the Ideas Immanent in Nervous Activity", Bulletin of Mathematical Biophysics, vol. 5, 1943, 19 pages.
Arcelli et al., "A New Technique for Image Magnification", p. 53-61, 2009.
Bennami, M., et al., Resource Allocation for Autonomic Data Centers Using Analytic Performance Models, 2005, IEEE, 12 pages.
Chang, F., et al., Automatic Configuration and Run-time Adaptation of Distributed Applications, 2000, IEEE, 10 pages.
Extended Search Report in European Application No. 16001480.9 dated Dec. 5, 2016.
Feldmeier, Improving Gateway Performance With a Routing-Table Cache, Massachusetts Institute of Technology, Laboratory for Computer Science, IEEE, Mar. 27, 1988, pp. 298-307.
Halpern, et al., Internet Draft, "Advertising Equal Cost Multipath routes in BGP; draft-bhatia-ecmp-routes-in-bgp-02.txt", The Internet Society 2006, 16 pages.
Kalogiros et al., "Understanding Incentives For Prefix Aggregation in BGP", Re-Architecting The Internet, ACM, Dec. 1, 2009, pp. 49-54.

(56) References Cited

OTHER PUBLICATIONS

Kounev, S., et al., Autonomic QoS-Aware Resource Management in Grid Computing Using Online Performance Models, 2007, ICST, Valuetools, 2007, 10 pages.

Ludwig, "Traffic engineering with BGP", Seminar "Internet Routing", Technical University Berlin, Jul. 2, 2009, pp. 1-10.

Schlansker et al., "Killer Fabrics for Scalable Datacenters", HP Technical Report, HPL-2009-26, 26 Feb. 26, 2009, 16 pages.

\* cited by examiner

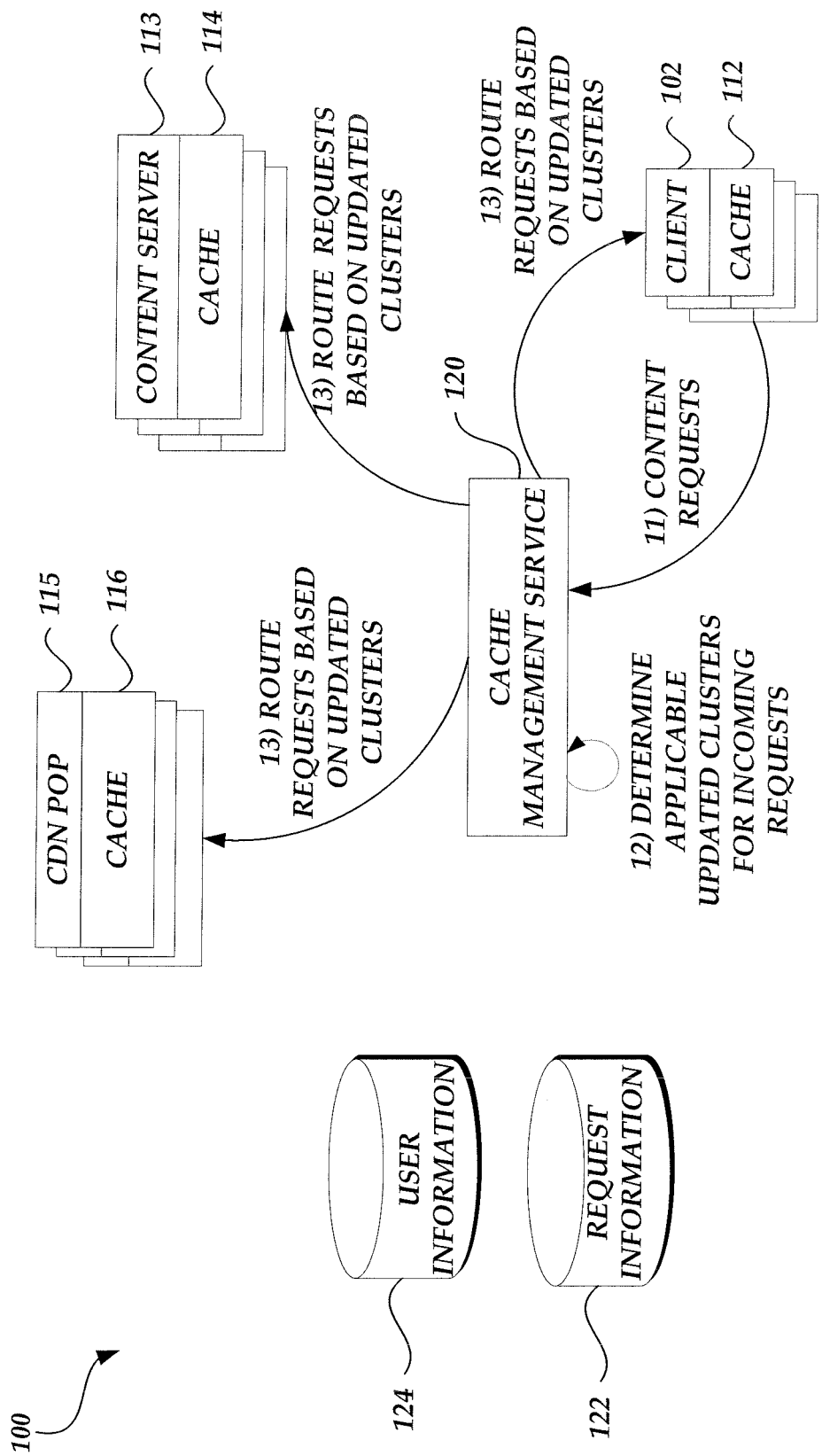

MACHINE LEARNING BASED CONTENT DELIVERY

CROSS-REFERENCE TO RELATED APPLICATIONS

This application is a continuation of U.S. patent application Ser. No. 14/578,189, entitled "MACHINE LEARNING BASED CONTENT DELIVERY," filed Dec. 19, 2014, which is hereby incorporated by reference herein in its entirety.

BACKGROUND

Generally described, computing devices and communication networks can be utilized to exchange information. In a common application, a computing device can request content from another computing device via the communication network. For example, a user at a personal computing device can utilize a software browser application to request a Web page from a server device via the Internet. In such embodiments, the user computing device can be referred to as a client computing device and the server device can be referred to as a content provider.

With reference to an illustrative example, a user of a client computing device may search for or navigate to a desired content item. The user may utilize an application to submit requests, search queries and other interactions to one or more content providers. The application may be a purpose-built application for requesting and interacting with such content items or the application may be a general purpose browser application. The requested content may be identified by one or more embedded resource identifiers, such as uniform resource locators ("URLs"). In turn, software on the client devices typically processes embedded resource identifiers to generate requests for the resources. Often, the resource identifiers reference a computing device associated with the content provider such that the client device would transmit the request for the resource to the referenced content provider computing device.

Some content providers attempt to facilitate the delivery of requested content through the utilization of a content delivery network ("CDN") service provider. A CDN service provider typically maintains a number of computing devices, generally referred to as "points of presence" or "POPs" in a communication network that can maintain content from various content providers. In turn, content providers can instruct, or otherwise suggest to, client computing devices to request some, or all, of the content provider's content from the CDN service provider's computing devices. With reference to the previous illustrative example, the content provider can leverage a CDN service provider with the modification or substitution of resource identifiers associated with the embedded resources. Specifically, the resource identifiers can reference a computing device associated with the CDN service provider such that the client computing device would transmit the request for the resource to the referenced CDN service provider computing device. Further, in many cases computing devices associated with content providers or CDN service providers cache content that is frequently requested. Similarly, client computing devices may cache content received from the content providers or CDN service providers. Serving requested content from caches at different locations reduces latency associated with content delivery to different extents.

From the perspective of a user utilizing a client computing device, a user experience can be defined in terms of the performance and latencies associated with obtaining network content over a communication network, such as obtaining a Web page or other network content, processing and rendering content on the client computing device, etc. Similarly, content providers are generally motivated to provide requested content to client computing devices often with consideration of efficiency and/or cost associated with transmission of the requested content. However, user experience may vary when requested content is being delivered to and rendered on client computing devices. The variance may depend on a combination of networking, computing, presenting, or other conditions associated with the content request and delivery process. On top of that, content providers associated with a business (e.g., an electronic commerce website), may also consider factors such as customer retention and/or business generation as they provide requested content to users.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIGS. 4A-4C are simplified block diagrams of the content delivery environment of FIG. 1 illustrating the routing of content requests as managed by the cache management service.

DETAILED DESCRIPTION

Figure 1:
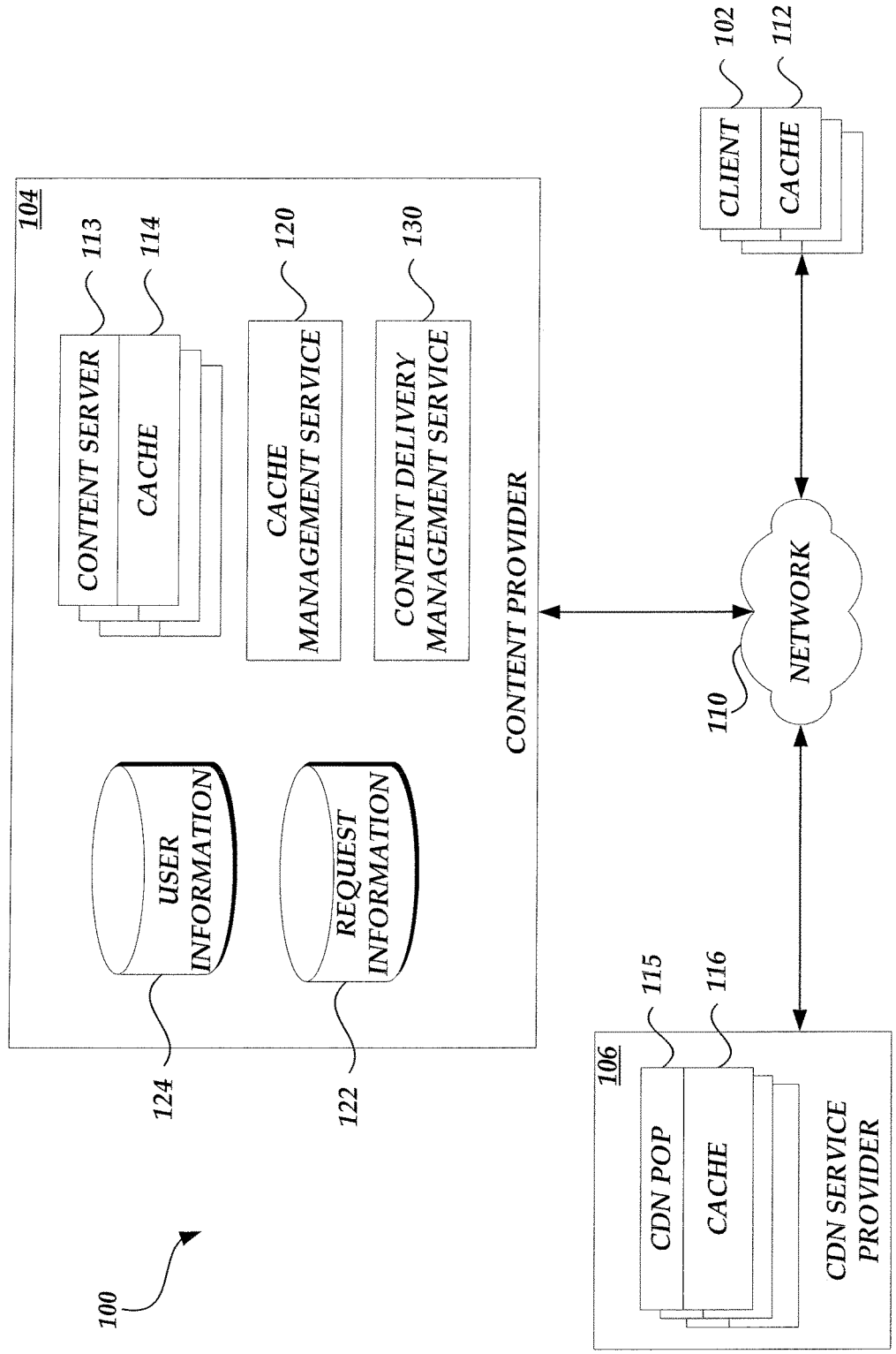
FIG. 1 is a block diagram illustrative of a content delivery environment including a number of client computing devices, a content provider including a cache management service and a content delivery management service, and a content delivery network service provider.

Generally described, the present disclosure is directed to managing content requests and delivery based on machine learning techniques in order to serve various or a combination of needs of a content provider, such as enhancement in user experience, business development and/or customer retention. Computing devices can be used to model content request, delivery, and rendering processes associated with a large number of users based on machine learning techniques, such as various supervised learning, unsupervised learning, and/or reinforcement learning techniques. These models can represent data relationships and patterns, such as functions, algorithms, systems, and the like. The models may accept data input, and produce output that corresponds to the input in some way. In some implementations, a model is used to generate a likelihood or set of likelihoods that the input corresponds to a particular group or value. For example, a model may be used to determine what content should be pre-cached at a server associated with a CDN service provider based on an estimated likelihood that a group of users will request the content in the near future. As another example, a model may be used to determine what content delivery strategy should be adopted for responding to a content request based on a predicted performance metric associated with the strategy as applied to the content request.

Specifically, some aspects of the disclosure will be described with regard to cache management via request routing and content pre-caching based on machine learning models. In one embodiment, a cache management service associated with a content provider may build a model to route incoming content requests to appropriate content serving computing devices (e.g., content servers of the content provider, POPs of an associated CDN service provider, or client computing devices associated with users) that are likely to have cached the requested content. The model can be built based on unsupervised clustering of past requests. For example, the cache management service may analyze content requests received by the content provider over a specified period of time and cluster the past requests based on a criterion that assesses their commonalities. The criterion may be a formula defining a distance among multiple requests. For example, requests for a same resource and submitted during a small time window on weekends by devices within a geographic region may have a small distance among them based on the formula, and therefore can form a cluster.

Once the clusters of past content requests are determined, the cache management service may associate each cluster with a respective subset of one or more content serving computing devices best situated to cache relevant content and respond to future content requests similar to those in the cluster. The cache management service may also instruct or otherwise cause the subset of content serving devices to pre-cache at least some content that were requested by the cluster of requests in anticipation of similar future requests routed their way. With the association between clusters and content serving computing devices established, the cache management service may start routing incoming content requests. Illustratively, the cache management service receives an incoming content request and determines a cluster that corresponds to the request, for example, based on the same criterion for assessing commonalities among requests. The cache management service then routes the incoming request to the subset of content serving computing devices that are associated with the determined cluster, for example, by way of DNS resolution, URL modification or other request routing techniques known in the art.

As the cache management service routes incoming requests based on the clusters, cache performance metrics (e.g., cache hit or miss rate, routing cost, user perceived latency, combination of the same, or the like) can be collected from the content serving devices or client computing devices. The cache management service may use information regarding the newly received and routed requests as well as the collected performance information to update and optimize the model. For example, the cache management service may re-generate the clusters based on newly received requests after the previous round of clustering. Alternatively, or in addition, the cache management service may modify the criterion for clustering, such as by adjusting weights or parameters of the formula for determining distance among requests. For example, the modifications may be designed to decrease the likelihood of forming clusters that resulted in weak cache or content delivery performance during the previous round, but increase the likelihood of generating clusters that may yield strong performance. The updating of the model can be performed periodically or based on conditions, such as when a performance metric drops below a threshold.

Other aspects of the disclosure will be described with regard to content delivery management via machine learning based content delivery strategy determination. In one embodiment, a content delivery management service associated with a content provider may build a model to determine appropriate content delivery strategies for responding to incoming content requests. The content delivery management service may or may not use the cache management service for request routing. The model can be a supervised learning model (e.g., a decision tree or artificial neural network) trained on historical data related to the processing of content requests and corresponding content delivery performance. For example, the content delivery management service may derived various attributes (e.g., requested resources, timing of requests, associated network condition, computing capability of request submitting device, geographic information, etc.) of each content request received by the content provider over a specified period of time. In some cases, applicable user attributes (e.g., demographics, purchase histories, Web browsing histories, search term histories, session tracking histories, ownership or rental lists, preferences, settings, etc.) associated with users who submitted the content requests can also be derived. The content delivery management service may also derive various content delivery strategy components (e.g., inclusion or exclusion of certain features in responses, lazy-loading or prefetching of resources, in-lining or external call for resources, low quality or high quality data formats, dependency graph associated with responses, above-the-fold configurations, routing of the requests, etc.) from data related to responses to each of the content requests. On the other hand, the content delivery management service can collect or derive content delivery performance metrics (e.g., perceived latency, error rate, cache efficiency, etc.) corresponding to each of the requests. In some cases, the content delivery performance metrics may include user-specific valuations, such as a purchase propensity corresponding to a likelihood that a user makes a related purchase (including its associated timing, type, amount, frequency, etc.) after receiving a response to the user's content request. All of the information regarding historical content requests, content delivery strategy and corresponding performance can be used as training data for the model.

After the model is trained, it is able to take attributes associated with an incoming content request as one part of input, take a candidate content delivery strategy (which may include a combination of strategy components) as another part of input, and generate one or more performance predictions for applying the candidate strategy in response to the content request as output of the model. The content delivery management service may apply the model to the incoming content request in conjunction with a set of candidate strategies and select a strategy that yields a best predicted performance. In some cases, the set of candidate content delivery strategies may include different combinations of strategy components that have a strong correlation with similar content requests in the training data. Once the strategy is selected, the content delivery management service executes the selected strategy, for example, by identifying a pre-generated response to the content request, dynamically generating HTML documents, causing content serving devices to pre-cache certain network resources, routing the request to a corresponding content server, combinations of the same, or the like.

In accordance with the content delivery strategy, the content delivery management service may transmit a response to the content requesting device, such as a client computing device. The response, such as an HTML file, may include information that causes the client computing device to perform further steps in accordance with the content delivery strategy, such as requesting embedded resources from CDN service providers based on an associated order or priority, pre-fetch content in anticipation of future requests, etc.

Still further aspects of the disclosure will be described with regard to the implementation of a portion of the model for content delivery strategy determination on client computing devices. In one embodiment, a global model employed by the content delivery management service may contain separable portions. Some of the separable portions may be executed on individual client computing devices that submit content requests. For example, some upper levels of a decision tree or some portion of input layer of an artificial neural network may be separable because the input to these portions corresponds to data accessible by individual client computing devices. Accordingly, client computing devices may apply the separable model portion on newly generated content requests, by way of a separate application or a script running within a content requesting application. The output of the locally implemented model portions can be included in content requests transmitted from client computing devices to the content provider and fed into the global model where appropriate (e.g., as input to a lower level of decision tree or an intermediate layer of neural network).

Further, the content delivery management service may dynamically determine which portion of the model should be implemented locally on different client computing devices. For example, at the beginning of a browse session a relatively simple and generic portion can be provided to the client computing device. As the content delivery management service processes more content requests from the client computing device during the browse session, the content delivery management may be able to determine the computing capability or data accessibility of the client computing device. Accordingly, the content delivery management service may provide a more complicated or specific portion of the model to the client computing device to execute locally.

In some cases, certain separable portions of the global model can be trained on individual client computing devices. For example, a sub decision tree or a portion of an artificial neural network input layer can be trained or updated on client computing devices based on local user data for user behavior prediction, such as predicting content that users will likely request in the near future. When the model portion is trained, it can be applied by individual client computing devices directly on newly generated content requests. Alternatively or in addition, the model portion can be updated by the content delivery management service as the global model is updated.

Still other aspects of the disclosure will be described with regard to facilitating rendering of responses to content requests via machine learning based above the fold ("ATF") determination. ATF generally corresponds to a portion of rendered content, such as a Web page or Web application, that is initially visible or otherwise perceivable to a user of a client computing device without scrolling. In one embodiment, the content delivery management service may build a model to determine appropriate ATF configurations for rendering responses to content requests. The model for ATF determination may be the same model as described above. For example, one of the outputs of the same model can correspond to an indication of an ATF configuration. Alternatively, the ATF determination model can be a standalone machine learning model.

Similarly, the model for ATF determination can be a supervised learning model (e.g., a decision tree or artificial neural network) trained on historical data related to content requests, corresponding responses and associated users. In particular, user interaction data (e.g., scrolling, dwelling, or clicking actions on Web pages or applications, browsing history, searching history, purchase history, product review history, user preference or setting history, or user location data) and client computing device data (e.g., screen size, screen resolution, browser window size, browser version, or device orientation) associated with historical content requests and their responses may be particularly relevant to the model training. For example, the data may reveal that a group of users frequently scroll down immediately from an ATF portion of a type of content that they requested. This may be treated as an indication that the current ATF configuration for rendering the type of content is not appropriate for the group of users. Depending on the consistency of the scrolling (e.g., by a similar number of pixels), the model may learn that the ATF should display a specific, lower portion of the content (or a feature or resource rendered therein) to the group of users. Based on the determined ATF configuration, the content delivery management service may further assign priorities for retrieval and rendering of various resources embedded in a response, so that portions of content that likely interest users most can be presented first in the ATF.

After the model for ATF determination is trained, it is able to take attributes associated with an incoming content request as one part of input, and possibly take a candidate content delivery strategy as another part of the input, and generate one or more indications of ATF configurations for rendering the response to the request. For example, the indication may be a prediction of a specific portion or feature of the response that the user intends to view or interact with. The content delivery management service may select an ATF configuration (e.g., based on associated confidence level or a predicted content delivery performance) may apply the ATF configuration in response to the content request (e.g., by modifying the order of calls for embedded resources, incorporating corresponding script code, etc.) The model for ATF determination can similarly be updated and optimized based on feedback data collected from client computing devices and other relevant sources.

Although various aspects of the disclosure will be described with regard to illustrative examples and embodiments, one skilled in the art will appreciate that the disclosed embodiments and examples should not be construed as limiting. For example, use of the term "content provider" is not intended to be limited to any particular type of service provider, whether discussed or described in examples. Accordingly, one skilled in the relevant art will appreciate that a content provider need not provide all, or any, of the additional services or functionality that may be associated with some content providers, such as one associated with an electronic commerce website.

FIG. 1 is a block diagram illustrative of a content delivery environment 100 including a number of client computing devices ("clients") 102, a content provider 104 including a cache management service 120 and a content delivery management service 130, and a CDN service provider 106. In an illustrative embodiment, the clients 102 can correspond to a wide variety of computing devices including personal computing devices, laptop computing devices, hand-held computing devices, terminal computing devices, mobile devices (e.g., smartphones, tablets), wireless devices, various electronic devices (e.g., televisions) and appliances and the like. The client 102 optionally includes an associated resource cache component 112 for storing resources from content providers or CDN service providers. In an illustrative embodiment, the client computing devices 102 include necessary hardware and software components for establishing communications over a communication network 110 with other components of the content delivery environment 100, and to request, receive, process, render, and present content. For example, the client computing devices 102 may be equipped with networking equipment and browser software applications that facilitate communications via the network 110. The network 110 may be a publicly accessible network of linked networks, possibly operated by various distinct parties, such as the Internet. In other embodiments, the network 110 may include a private network, personal area network ("PAN"), LAN, WAN, cable network, satellite network, etc. or some combination thereof, each with access to and/or from the Internet.

The content delivery environment 100 can also include a content provider 104 in communication with the one or more clients 102 and the CDN service provider 106 via the communication network 110. Illustratively, one or more clients 102 may be associated with the content provider 104. For example, a user may have an account with the content provider 104, or the client 102 may be configured to exchange information with certain components of the content provider 104.

The content provider 104 illustrated in FIG. 1 comprises a logical association of one or more computing devices associated with the content provider for hosting content and servicing requests for the hosted content over the network 110. Specifically, the content provider 104 can include one or more content servers 113 each corresponding to one or more server computing devices for obtaining and processing requests for content (such as content pages or network resources) from the clients 102, the cache management service 120, the content delivery management service 130, or other devices or service providers. The content server 113 can optionally include an associated resource cache component 114 (e.g., a number of cache server computing devices) for storing resources and transmitting to various clients 102 without the need for generating the content or retrieving from another source, such as a data store. The content servers 113 may further include additional software and/or hardware components that facilitate communications including, but not limited, load balancing or load sharing software/hardware components.

The content provider 104 illustrated in FIG. 1 can also include a request information data store 122 and a user information data store 124. The request information data store 122 and the user information data store 124 can generally include any repository, database or information storage system embodied in non-transitory computer readable media such as a disk memory, flash memory, optical memory and the like, which can store data regarding content requests and users who request content from the content provider, as well as any associated metadata. Even further, the data stores 122 and 124 can include network-based memories. Although illustrated as single entities, the data stores 122 and 124 may be implemented in a distributed fashion to optimize its communication with other components of the content delivery network 100.

The data stored in the request information data store 122 can include any information related to content requests, corresponding responses and performance thereof. The data may be in a form of system logs recording received content requests and corresponding responses in their raw format with time stamps. Alternatively, or in addition, the data may be organized in accordance with various attributes that can be derived from the raw data. For example, requested resources, timing of requests, associated network condition or topology, characteristics of requesting devices (e.g., operating system, browser version, device model, form factor, display size, input devices, processor type, etc.), associated location information (e.g., IP address of requesting devices), etc., can be derived from the raw data to characterize content requests. As another example, inclusion or exclusion of types of features, lazy-loading or prefetching of resources, in-lining or external calls for resources, low quality or high quality data formats, associated dependency graphs, above the fold information, routing of the requests, etc., can be derived from the raw data to characterize content delivery strategies in responding to content requests. As yet another example, DNS resolution latency and performance, total time to load a content page and individual network resources, number of times the content page or individual network resources was retrieved, bandwidth utilization, network latency, number of hops between client and server, processor utilization, memory utilization, cache hit/miss ratio, load time per cache miss, etc., can be derived from the raw data to characterize performance of content request processing and corresponding content delivery strategy. The request information included in data store 122 may be obtained from multiple sources, such as various components of the content provider 104, CDN service provider 106 or clients 102.

The data stored in the user information data store 124 can include any information related to users associated with the content provider 104. For example, the user information may include user characteristic or demographic data, such as age, gender, ethnicity, religion, geographic location, occupation, income, spending levels, content interests, hobbies, preferences, settings, and the like. As another example, the user information may include user interaction data, such as scrolling, dwelling, or clicking actions on Web pages or applications, purchase histories, Web browsing histories, search histories, session tracking histories, ownership or rental lists, user reviews, customer service interactions, and the like. The user information included in the user information data store 124 may be cross referenced with the request information include in the request information data store 122, for example, based on browser cookie or other user identification mechanism.

The content provider 104 illustrated in FIG. 1 can further include the cache management service 120 for optimizing cache performance utilizing machine learning model based content request routing. As will be described in more detail below, illustratively, the cache management service 120 builds a model to route incoming content requests to appropriate content serving computing devices (e.g., content servers of the content provider, POPs of an associated CDN service provider, or client computing devices associated with users) that are likely to have cached the requested content, and update the model from time to time based on cache performance feedbacks. Although the cache performance management service 120 is illustrated as a single component, one skilled in the relevant art will appreciate that the cache performance management service 120 may be implemented in a distributed manner. Additionally, the cache performance management service 120 may be implemented as a stand-alone service hosted on a computing device or in a virtualized environment. Still further, the cache performance management service 120 can also be implemented as part of a CDN service provider 106 or other service provider, such as a DNS service provider.

Still further, the content provider 104 illustrated in FIG. 1 can include the content delivery management service 130 for determining and implementing optimized content delivery strategy in response to content requests based on machine learning models. As will be discussed in more detail below, illustratively, the content delivery management service 130 may build one or more models for predicting performance of proposed content delivery strategies and for determining appropriate ATF configurations in response to content requests, determine and execute a strategy that yields best predicted performance. Although the content delivery management service 130 is illustrated as a single component, one skilled in the relevant art will appreciate that the content delivery management service 130 may be implemented in a distributed manner. Additionally, the content delivery management service 130 may be implemented as a stand-alone service hosted on a computing device or in a virtualized environment. Still further, the content delivery management service 130 can also be implemented as part of a CDN service provider 106 or other service provider, such as a DNS service provider.

Although not illustrated in FIG. 1, the content provider 104 can be associated with a number of additional or supplement components to facilitate interaction with clients 102 or service providers. For example, a content provider 104 may maintain one or more DNS name server components that are operative to receive DNS queries related to registered domain names associated with the content provider 104. The content provider 104 can also maintain additional storage components, such as proxy servers, or utilize network storage service providers to maintain at least a portion of the content/resources provided to the client computing devices 102. Additionally, the content servers 113 may be geographically distributed throughout the communication network 110 in a manner to best serve various demographics of clients 102.

With continued reference to FIG. 1, the content delivery environment 100 can further include the CDN service provider 106, in communication with the one or more clients 102 and the content provider 104 via the communication network 110. The CDN service provider 106 illustrated in FIG. 1 corresponds to a logical association of one or more computing devices associated with a service provider. Specifically, the CDN service provider 106 can include a number of Point of Presence ("POP") locations 115 that correspond to nodes on the communication network 110. Each POP 115 optionally includes a resource cache component 116 made up of a number of cache server computing devices for storing resources from content providers or network storage providers and transmitting various requested resources to various clients 102. The POPs 115 may further include additional software and/or hardware components that facilitate communications including, but not limited, DNS resolution, load balancing or load sharing software/hardware components.

One skilled in the relevant art will appreciate that the components and configurations provided in FIG. 1 are illustrative in nature. Accordingly, additional or alternative components and/or configurations, especially regarding the additional components, systems, and subsystems for facilitating functions disclosed herein may be utilized.

Figure 2:
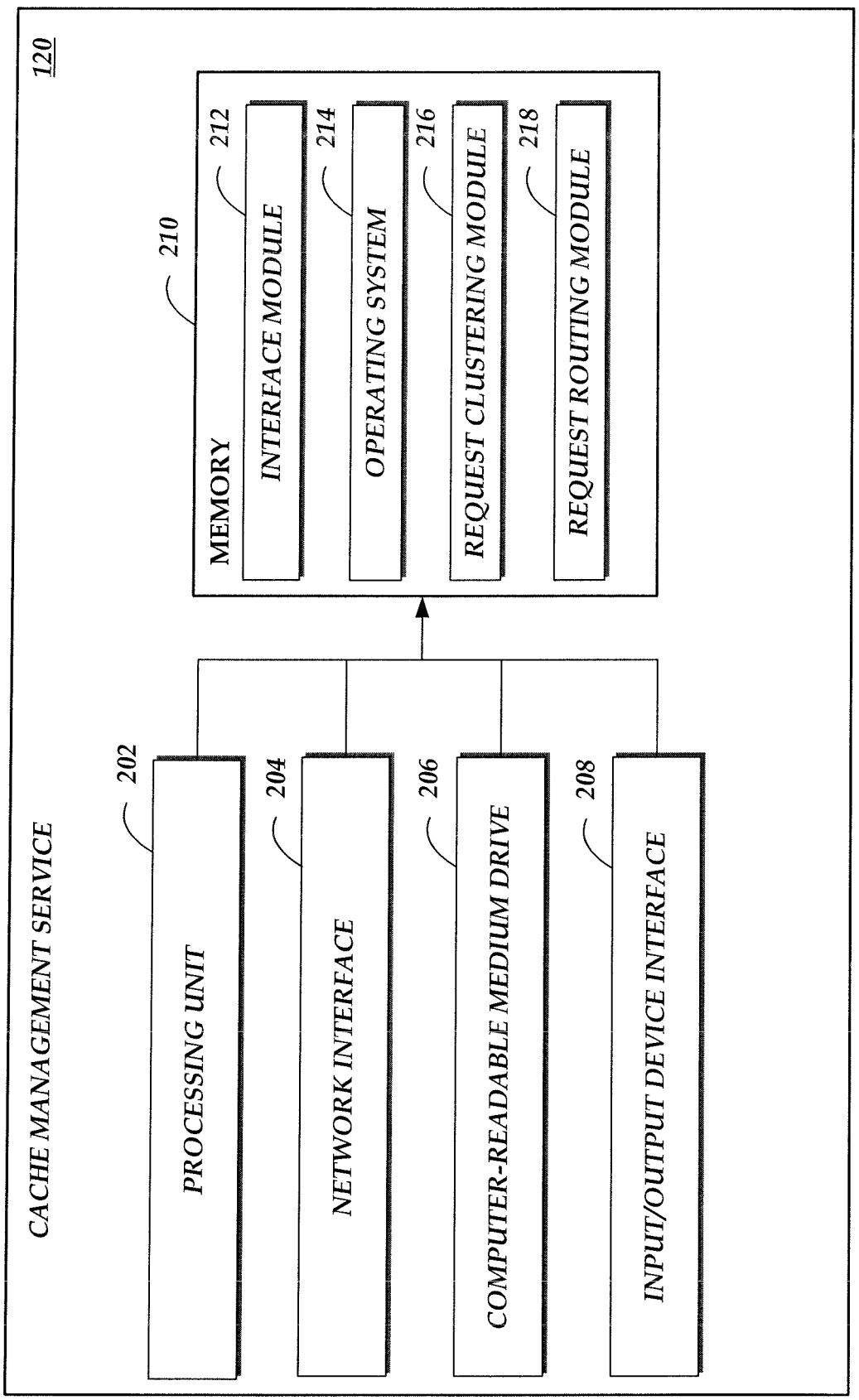
FIG. 2 is a block diagram illustrative of one embodiment of example components of the cache management service utilized in accordance with the content delivery environment of FIG. 1.

FIG. 2 is a block diagram illustrative of one embodiment of example components of the cache management service 120 utilized in accordance with the content delivery environment 100 of FIG. 1. The cache management service 120 includes an arrangement of computer hardware and software components that may be used to implement aspects of the present disclosure. Those skilled in the relevant art will appreciate that the cache management service 120 may include more (or fewer) components than those depicted in FIG. 2. It is not necessary, however, that all of these generally conventional components be shown in order to provide an enabling disclosure.

In the illustrated embodiment, the cache management service 120 includes a processing unit 202, a network interface 204, a non-transitory computer-readable medium drive 206, and an input/output device interface 208, all of which may communicate with one another by way of a communication bus. The network interface 204 may provide the cache management service 120 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the cache management service 120. The memory 210 may further include other information for implementing aspects of the present disclosure.

In one embodiment, the memory 210 includes an interface module 212. The interface module 212 can be configured to facilitate generating one or more user interfaces through which a component of the content provider 104, CDN service provider 106, a client 102 or other computing devices may send to, or receive from, the cache management service 120 data regarding machine learning models, content requests, content to pre-cache, cache distribution and performance, etc., or otherwise communicate with the cache management service 120. Illustratively, the user interface can be implemented as a graphical user interface (GUI), network-based user interface, computer program, smartphone or tablet program or application, touchscreen, wearable computing device interface, command line interface, gesture, voice, or text interface, etc., or any combination thereof.

In addition, the memory 210 may include a request clustering module 216 that may be executed by the processing unit 202. In an example embodiment, the request clustering module 216 implements aspects of the present disclosure. For example, the request clustering module 216 can be configured to implement various computational, statistical, or machine learning methods, for example, clustering or classification algorisms to group or categorize requests for network resources based on criteria related to optimization of cache performance. The data analyzed by the request clustering module 216 for generating clusters of content requests can be forwarded from the interface module 212 or obtained from a repository or storage system of the content provider 104 that maintains such information, such as the request information data store 122 and user information data store 124. The request clustering module 216 may also be configured to associate content serving computing devices with content caching components or capabilities (e.g., content servers 113, CDN POPs 115, or clients 102) with individual clusters or groups of the historical content requests.

The memory 210 may further include a request routing module 218 that may be executed by the processing unit 202. In an example embodiment, the request routing module 218 implements aspects of the present disclosure. For example, the request routing model 218 can be configured to process client requests for content, such as network resources, and route the request based on clusters or groups of historical requests. Specifically, the client request can be forwarded to the request routing module 218 by the interface module 202. The request routing module 218 can match the client request with one or more clusters or groups of content requests, and route the client request to one or more content serving computing devices associated a matching cluster or group.

It should be noted that the cache management service 120 may be implemented by some or all of the components present in FIG. 2. In addition, the cache management service 120 may include additional components not present in FIG. 2. The modules or components described above may also include additional modules or be implemented by computing devices that may not be depicted in FIG. 1 or 2. For example, although the interface module 212, the request clustering module 216 and the request routing module 218 are identified in FIG. 2 as single modules, one skilled in the relevant art will appreciate that the modules may be implemented by two or more modules and in a distributed manner. As another example, the cache management service 120 and its components can be implemented by network servers, application servers, database servers, combinations of the same, or the like, configured to facilitate data transmission to and from components of the content provider 104, CDN service provider 106, clients 102, or other computing devices or components, via network 110. Accordingly, the depictions of the modules are illustrative in nature.

Figure 3:
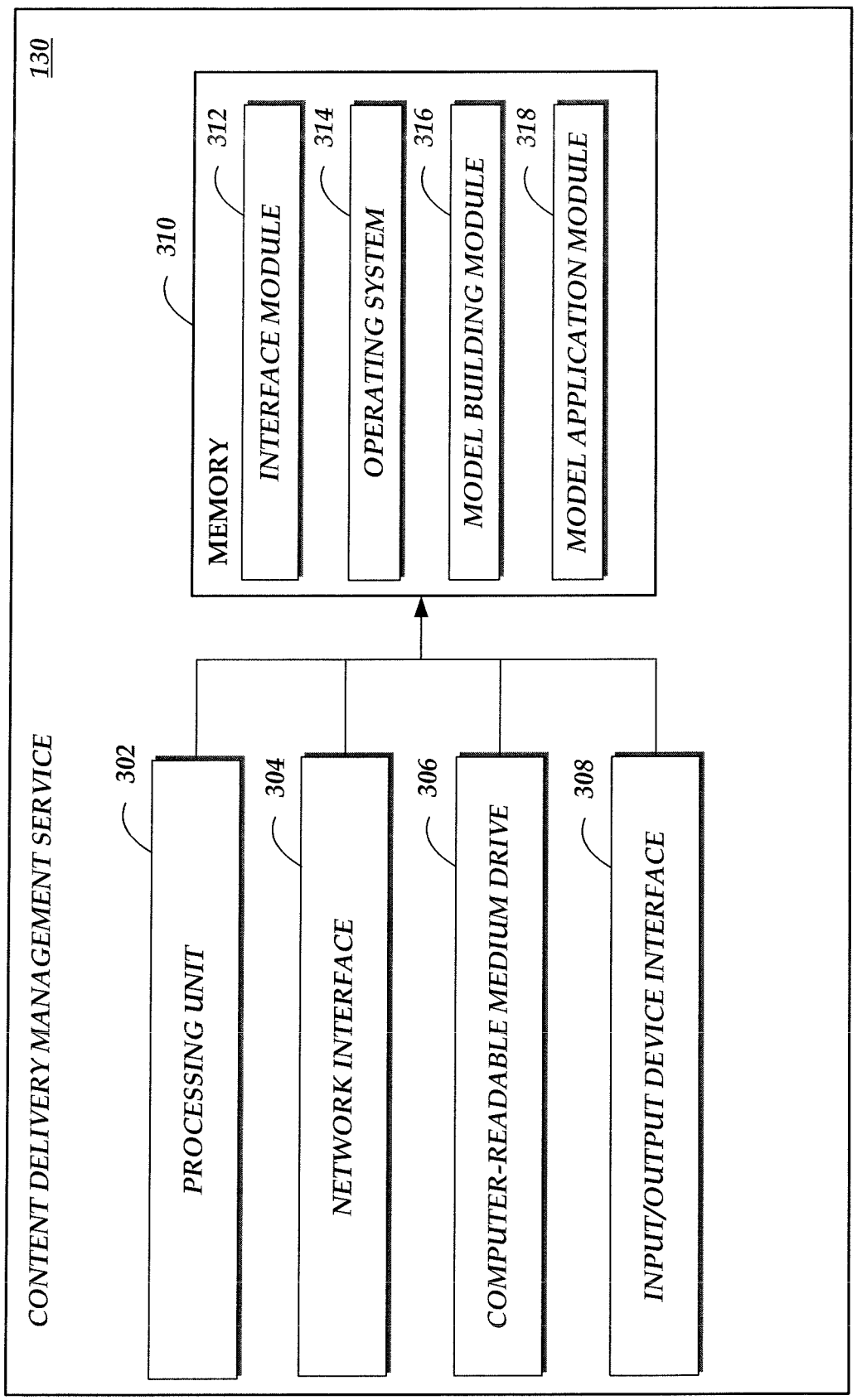
FIG. 3 is a block diagram illustrative of one embodiment of example components of the content delivery management service utilized in accordance with the content delivery environment of FIG. 1.

FIG. 3 is a block diagram illustrative of one embodiment of example components of the content delivery management service 130 utilized in accordance with the content delivery environment 100 of FIG. 1. Similar to the illustrative implementation of the cache management service 120, the content delivery management service 130 includes an arrangement of computer hardware and software components that may be used to implement aspects of the present disclosure. Those skilled in the relevant art will appreciate that the content delivery management service 130 may include more (or fewer) components than those depicted in FIG. 3. It is not necessary, however, that all of these generally conventional components be shown in order to provide an enabling disclosure.

In the illustrated embodiment, the content delivery management service 130 includes a processing unit 302, a network interface 304, a non-transitory computer-readable medium drive 306, and an input/output device interface 308, all of which may communicate with one another by way of a communication bus. The network interface 304 may provide the content delivery management service 130 with connectivity to one or more networks or computing systems. The processing unit 302 may thus receive information and instructions from other computing devices, systems, or services via a network. The processing unit 302 may also communicate to and from memory 310 and further provide output information via the input/output device interface 308. The input/output device interface 308 may also accept input from various input devices, such as a keyboard, mouse, digital pen, touch screen, etc.

The memory 310 may contain computer program instructions that the processing unit 302 may execute in order to implement one or more embodiments of the present disclosure. The memory 310 generally includes RAM, ROM and/or other persistent or non-transitory computer-readable storage media. The memory 310 may store an operating system 314 that provides computer program instructions for use by the processing unit 302 in the general administration and operation of the content delivery management service 130. The memory 310 may further include other information for implementing aspects of the present disclosure.

In one embodiment, the memory 310 includes an interface module 312. The interface module 312 can be configured to facilitate generating one or more user interfaces through which a component of the content provider 104, CDN service provider 106, a client 102 or other computing devices may send to, or receive from, the content delivery management service 130 data regarding machine learning models, content requests, users, content delivery strategy, ATF configurations, content delivery performance, etc., or otherwise communicate with the content delivery management service 130. Illustratively, the user interface can be implemented as a graphical user interface (GUI), network-based user interface, computer program, smartphone or tablet program or application, touchscreen, wearable computing device interface, command line interface, gesture, voice, or text interface, etc., or any combination thereof.

In addition, the memory 310 may include a model building module 316 that may be executed by the processing unit 302. In an example embodiment, the model building module 316 implements aspects of the present disclosure. For example, the model building module 316 can be configured to employ various supervised machine learning methods, as well as other computational or statistical methods for building one or more models for determining content delivery strategy and ATF configuration for responses to content requests. The data for training or updating the models can be forwarded from the interface module 312 or obtained from a repository or storage system of the content provider 104 that maintains such information, such as the request information data store 122 and user information data store 124.

The memory 310 may further include a model application module 318 that may be executed by the processing unit 302. In an example embodiment, the model application module 318 implements aspects of the present disclosure.

For example, the model application module 318 can be configured to process client requests for content, such as network resources, and feed applicable features related to the client requests to the model in conjunction with candidate content delivery strategies. The model application module 318 may then determine a content delivery strategy (and possibly an ATF configuration for a corresponding response) that is predicted be associated with optimized performance in accordance with a criterion or metric. The model application module 318 may also determine, provide and update applicable model portions to be executed on client computing devices.

It should be noted that the content delivery management service 130 may be implemented by some or all of the components present in FIG. 3. The content delivery management service 130 may or may not be implemented by the same computing device(s), components or systems that implement the cache management service 120. In addition, the content delivery management service 130 may include additional components not present in FIG. 3. The modules or components described above may also include additional modules or be implemented by computing devices that may not be depicted in FIG. 1 or 3. For example, although the interface module 312, the model building module 316 and the model application module 318 are identified in FIG. 3 as single modules, one skilled in the relevant art will appreciate that the modules may be implemented by two or more modules and in a distributed manner. As another example, the content delivery management service 130 and its components can be implemented by network servers, application servers, database servers, combinations of the same, or the like, configured to facilitate data transmission to and from components of the content provider 104, CDN service provider 106, clients 102, or other computing devices or components, via network 110. Accordingly, the depictions of the modules are illustrative in nature.

With reference now to FIGS. 4A-4C and 5A-5C, the interactions among various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 4A:
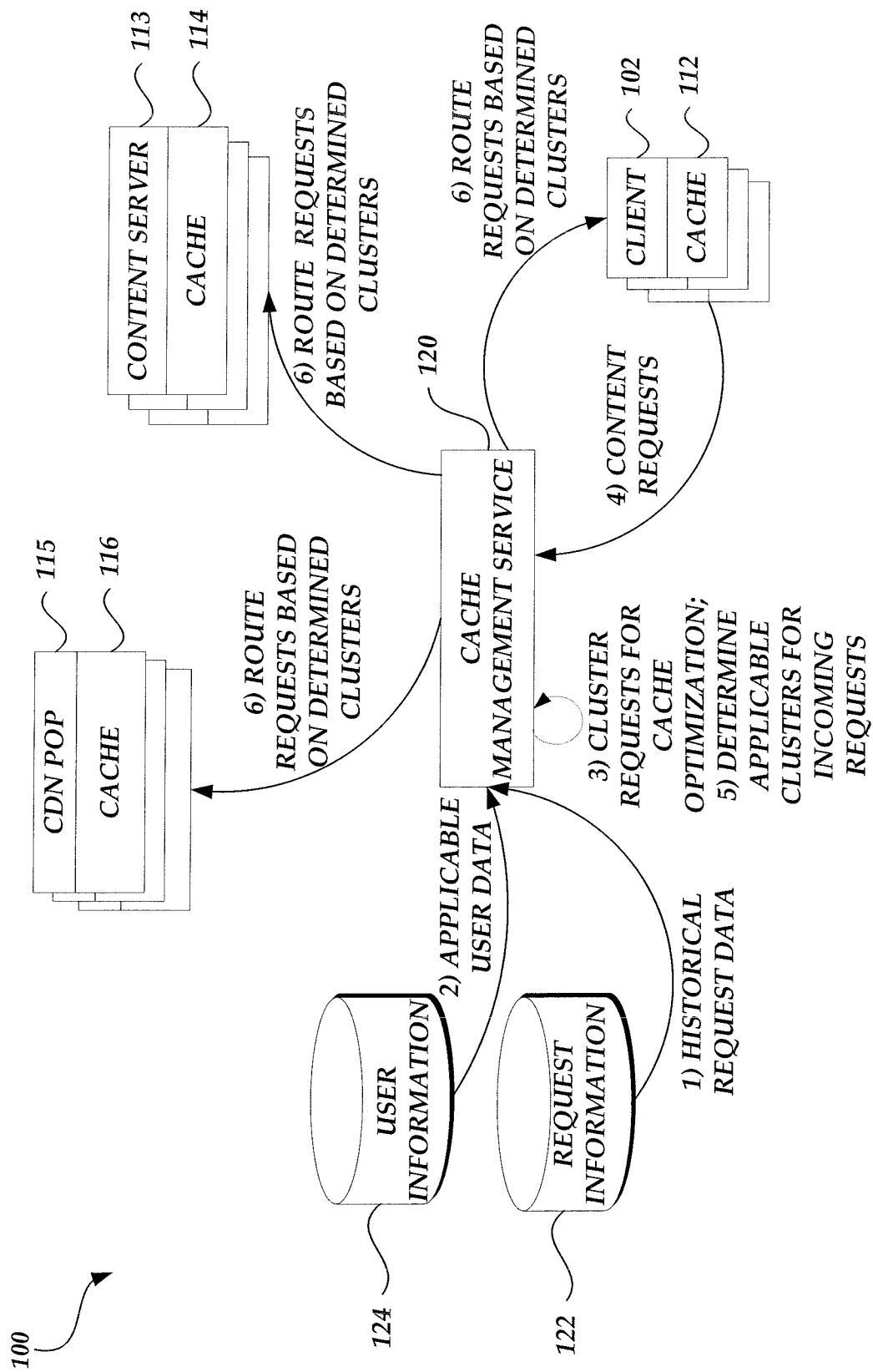
Figure 4B:
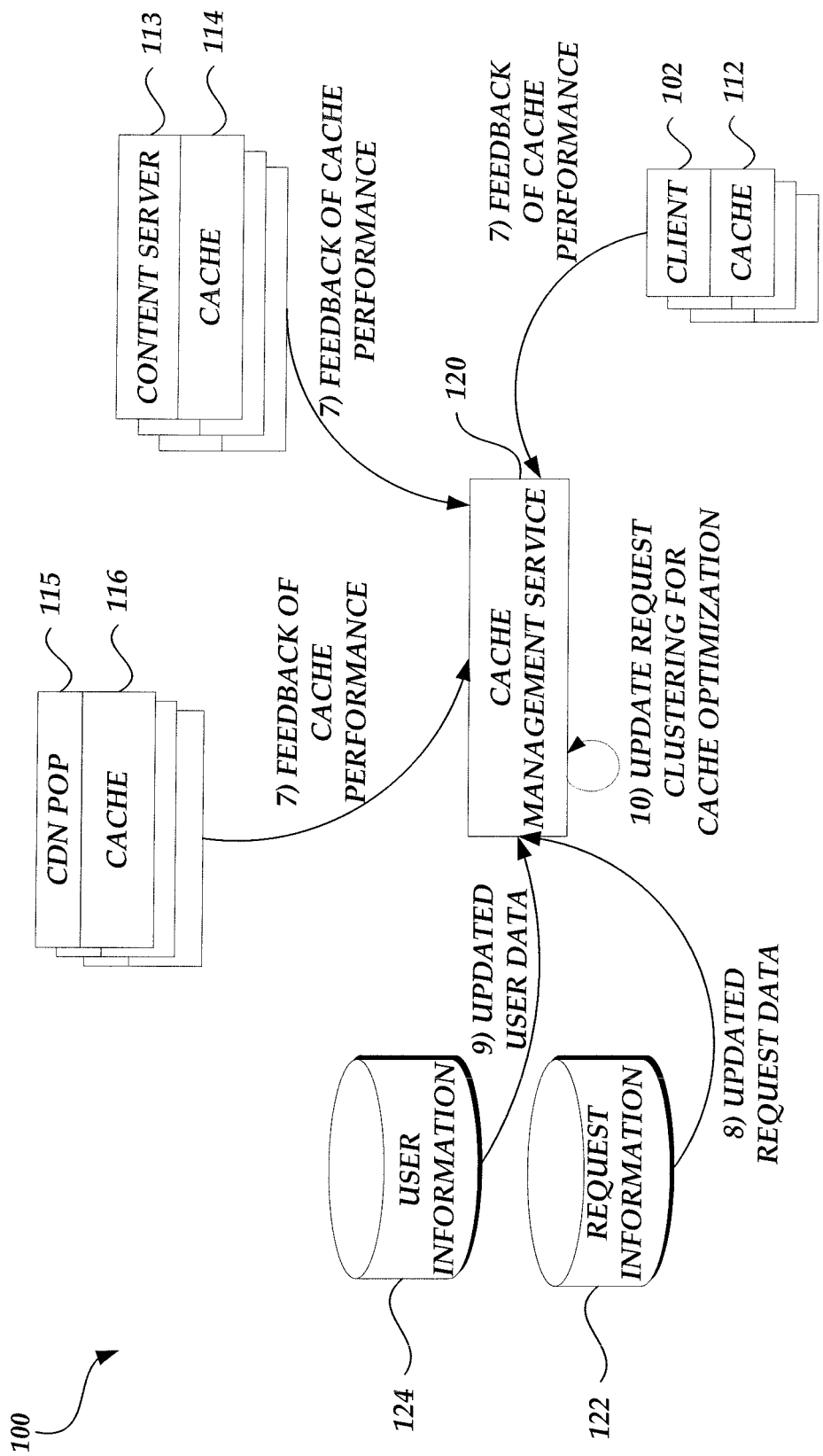

FIGS. 4A-4C are simplified block diagrams of the content delivery environment 100 of FIG. 1 illustrating the routing of content requests as managed by the cache management service 120. With reference to FIG. 4A, at (1), the cache management service 120 obtains historical data regarding content requests from the request information data store 122. As described above, the historical data can include any attributes or aspects about individual client requests to the content provider 104 or an associated CDN service provider 106 for network resources. For example, the historical data regarding content requests may include a type or identifier of requested resources, timing of requests, associated network condition or topology, characteristics of requesting devices, associated geographic information, etc., for individual content requests within the past 30 days. The historical data may be in a form of raw system logs with time stamps. Alternatively or in addition, the historical data may be organized and searchable based on the various attributes about individual content requests.

At (2), the cache management service 120 obtains user data that is applicable to the historical content requests. As described above, the user data may include any information related to users associated with the content provider 104. For example, the user information may include user characteristic data, such as age, gender, ethnicity, religion, geographic location, occupation, income, spending levels, content interests, hobbies, and the like. As another example, the user information may include user interaction data, such as purchase histories, Web browsing histories, search term histories, session tracking histories, ownership or rental lists, user reviews, customer service interactions, and the like. Where applicable, the cache management service 120 may correlate applicable user data with at least a subset of the historical content requests.

At (3), the cache management service 120 clusters or groups the historical content requests referenced by the obtained data. Various computational, statistical, or machine learning methods (e.g., k-means, mixture models, hierarchical clustering, or other unsupervised clustering or classification algorisms) can be employed to group the content requests so that each group may be associated with dedicated content serving devices. Any combination of attributes derived from the content requests data or applicable user data can be used as features for individual content requests. This way, content requests may be represented as vectors of features and fed into an applicable clustering or classification algorithm.

In some embodiments, the clustering algorithm includes one or more criteria for grouping the content requests. For example, the criterion may correspond to a formula for calculating distances between or among content requests. The formula for calculating distances may include heuristics for improving cache performance of content serving devices associated with the content provider 104, CDN service provider 106, or clients 102. Illustratively, distances between or among content requests in accordance with the formula may be smaller if the content requests include a same requested resource, are submitted by clients within a same geographic region, a same network domain or through a same Internet service provider (ISP), relate to users of similar income level or purchase interests, are transmitted within a small window of date or time, combinations of the same, or the like.

Based on the one or more criteria for request grouping, the cache management service 120 determines multiple clusters or groups of the historical content requests. Depending on the clustering method or criteria, these groups can be mutually exclusive, overlapping, forming a hierarchical relationship, or probabilistic. The cache management service 120 then associates content serving computing devices (e.g., content servers 113, CDN POPs 115, clients 102, etc.) with each of the groups. The association may be a one-to-one, one-to-many, many-to-one, or many-to-many relationship. Characteristics can be derived from each of the groups, which may facilitate associating content serving devices with the groups. For example, if one group of requests mostly originated from mobile devices utilizing a wireless network, the cache management service 120 may associate a CDN POP 115 located close to a mobile endpoint for the wireless network with that group. As another example, the size of a group of content requests may inform a number of content serving devices to be associated with the group (e.g., the larger the size of a group the more content serving devices are associated with the group).

Characteristics of content request groups may also be used by the cache management service 120 to instruct or otherwise cause content serving devices to pre-cache content. For example, if one group of requests generally corresponds to requests submitted during a specific time window (e.g., between 9 am and 12 pm on Mondays), the cache management service 120 may cause content service devices associated with the group to pre-cache at least a portion of content requested by the group of requests prior to the time window. As such, the association between content serving devices and groups of requests can be time based. Illustratively, a same content service device can be associated with one group for a first period of time, and be associated with another group for a second period of time. This can be further facilitated by setting expiration time (e.g., time to life or "TTL") of content cached by the content service device in accordance with times of "switch-overs" between the associations with different groups of content requests.

At (4), the cache management service 120 obtains new requests for content that originated from clients 102. Illustratively, the client 102 may generate a request for content by loading a browser for viewing network content in response to an event or user action. The browser may be implemented to request network resource via a browse session request to the network content provider 104. Illustratively, this request may be generated automatically as a result of the browser loading (e.g., a request for a default or "home" page), or may be generated as a result of a user following a link or entering a network address into an address bar of the browser. Once the request is received by a component of the content provider 104, the request can be forwarded to the cache management service 120.

At (5), the cache management service 120 determines one or more clusters or groups of historical content requests that are applicable to newly obtained content requests. For example, the cache management service 120 may compute an average distance between a newly obtained content request to all historical requests of a group. The average distance can be computed with respect to each group of historical requests and an ordered list of groups can be generated based on corresponding average distances. Illustratively, the cache management service 120 may select a specified number of groups from the top of the list and assign a respective confidence level (e.g., a value inversely proportional to a corresponding average distance and further weighted by a corresponding group size) for associating the newly obtained content request with each of the top groups.

In some embodiments, the cache management service 120 always assigns the newly obtained content request to a group that has the highest confidence level. In other embodiments, the cache management service 120 probabilistically assigns the newly obtained content request to groups based on their respective confidence levels. For example, the likelihood the new content request is assigned to a specific group can be made proportional to the value of confidence level for the group.

At (6), the cache management service 120 routes the newly obtained requests to various content serving computing devices (e.g., content servers 113, CDN POPs 115, clients 102, etc.) associated with the assigned group. This can be achieved by DNS resolution, URL modification, or other techniques known in the art. Ideally, if the newly obtained content requests follow a similar pattern as the historical content requests, the performance of cache components associated with the various content serving computing devices are optimized in accordance with the clustering of content requests.

In some embodiments, the cache management service 120 may associate additional content serving devices to a cluster or group that matches the newly obtained content request. For example, the cache management service 120 may have detected significantly more content requests that match a particular group than what is considered proportional to the size of the particular group. In this case, the cache management service 120 may assign one or more additional servers to be associated with the particular group and route the newly obtained content request to the additional server.

At (7), the cache management service 120 obtains feedback data of cache performance related to the routing of the newly obtained content requests from the various content serving devices. The feedback data may be transmitted from the content serving devices to the cache management service directly. Alternatively or in addition, the feedback data may be transmitted to other components of the content provider 104 and maintained by the request information data store 122. As described above, the cache performance feedback data may include performance metrics about cache components (e.g., cache hit/miss rate) or performance metrics about content delivery (e.g., latency information) in response to content requests.

At (8), the cache management service 120 obtains updated content request data (e.g., data about more recent content requests) from the request information data store 122. At (9), the cache management service 120 obtains updated user data that is applicable to the updated content request data from the user information data store 124. At (10), the cache management service 120 updates the clustering of content requests based on the feedback data and updated data regarding more recent content requests. In some embodiments, the cache management service may define a metric to measure cache performance. For example, the cache performance metric can be as simple as an average cache hit rate of all content serving devices that respond to content requests directed to the content provider 104. A more complicated example can be a weighted average of cache hit rate and user's perceived latency, which can be further augmented or discounted by a quality value of corresponding content requests (e.g., a high quality value may be assigned to authentic human generated requests and a low quality value may correspond to requests generated by an automatic Web crawler).

Using the defined cache performance metric, the cache management service 120 may assess cache performance of content serving devices that are associated with previously determined groups of content requests. The cache management service 120 may compare groups that correspond to high values in cache performance with groups that correspond to low performance, and then determine which features or measurement of similarities between content requests contribute more to the formation of high performing groups (or low performing groups). The cache management service 120 may then adjust the criteria, such as changing a distance formula to emphasize certain content request features while discounting others, so that high performing clusters or groups are more likely to occur through the clustering process.

The adjusted criteria can be used to cluster the more recent content requests referenced by the updated data. Accordingly, the cache management service 120 determines a set of updated clusters of content requests and re-associates content serving devices with each of the updated clusters, which are likely to achieve better cache performance than the clusters previously determined. The updating of clustering criteria and re-generation of content request clusters can be performed periodically (e.g., every 30 days) or based on a condition (e.g., a cache performance metric value falls below a predetermined threshold).

With reference to FIG. 4C, at (11), the cache management service 120 obtains new content requests in a way similar to what was performed at (4). At (12), the cache management service 120 determines one or more updated clusters or groups of content requests for each of the new content requests and assigns each request to a matching group. Again, this can be performed in a way similar to (5). At (13), the cache management service 120 routes each of the new content requests to one or more content serving devices associated with a corresponding matching group for the request.

Figure 5A:
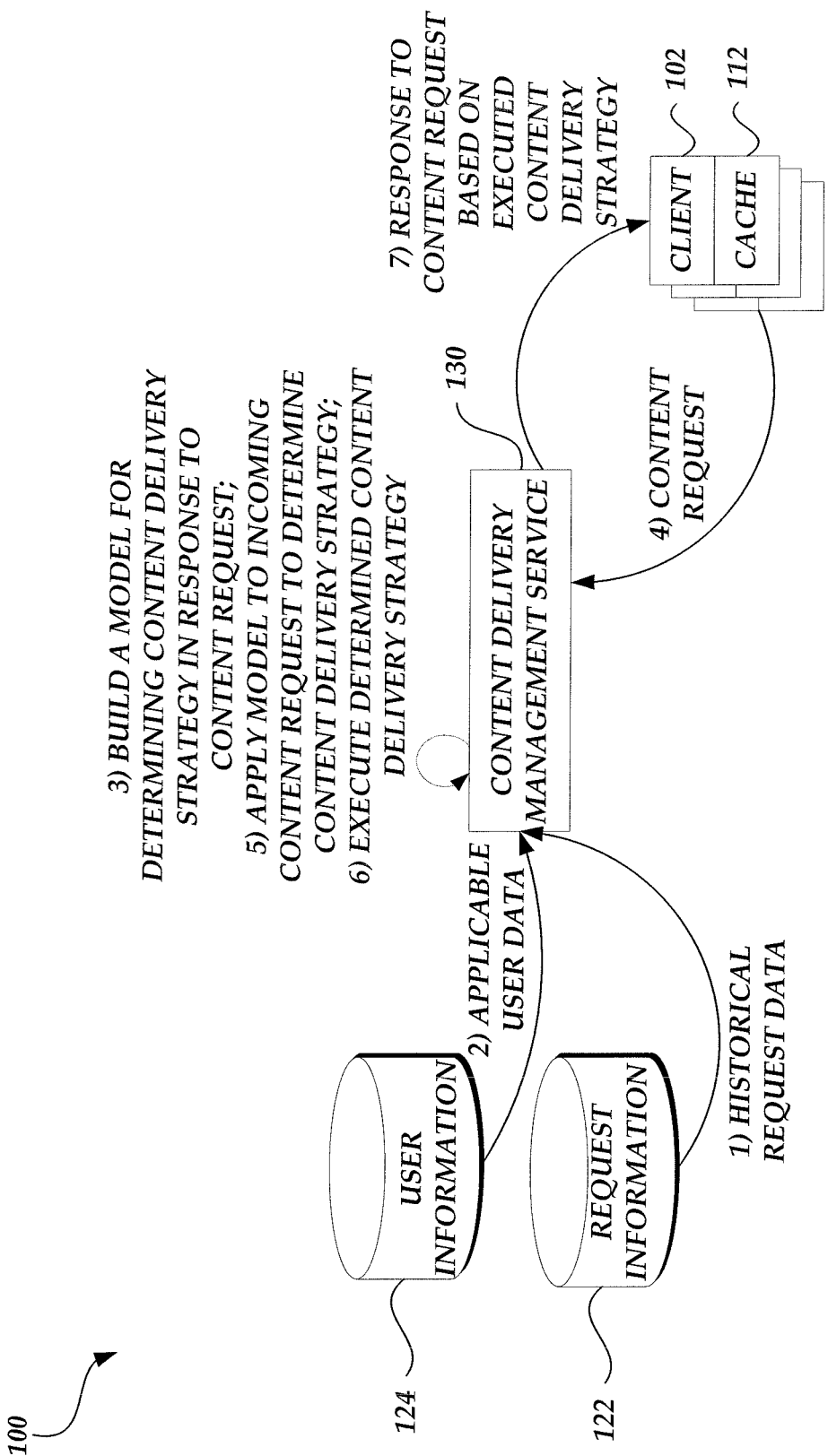
FIGS. 5A-5C are simplified block diagram of the content delivery environment of FIG. 1 illustrating the processing of content requests as managed by the content delivery management service.
Figure 5B:
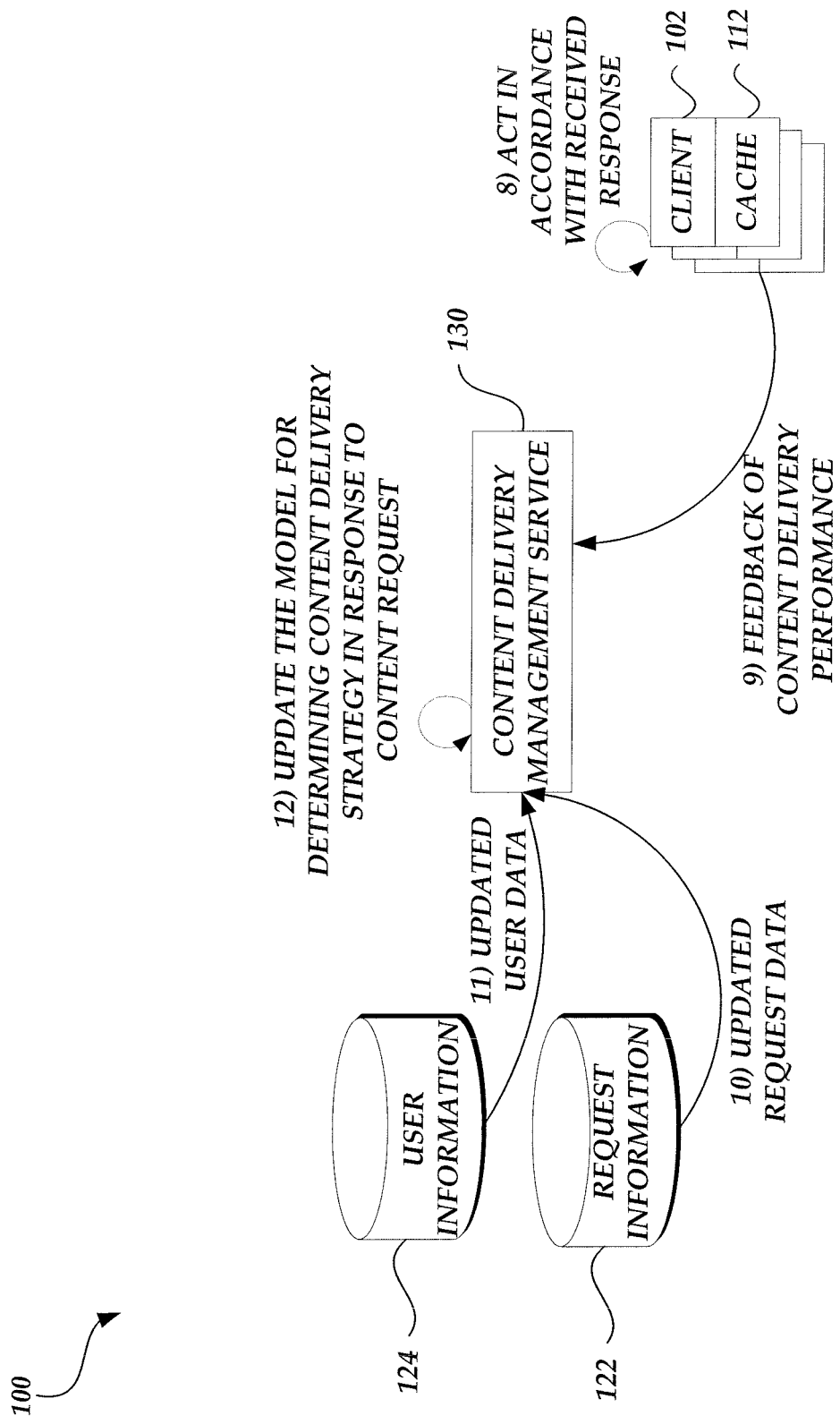
Figure 5C:
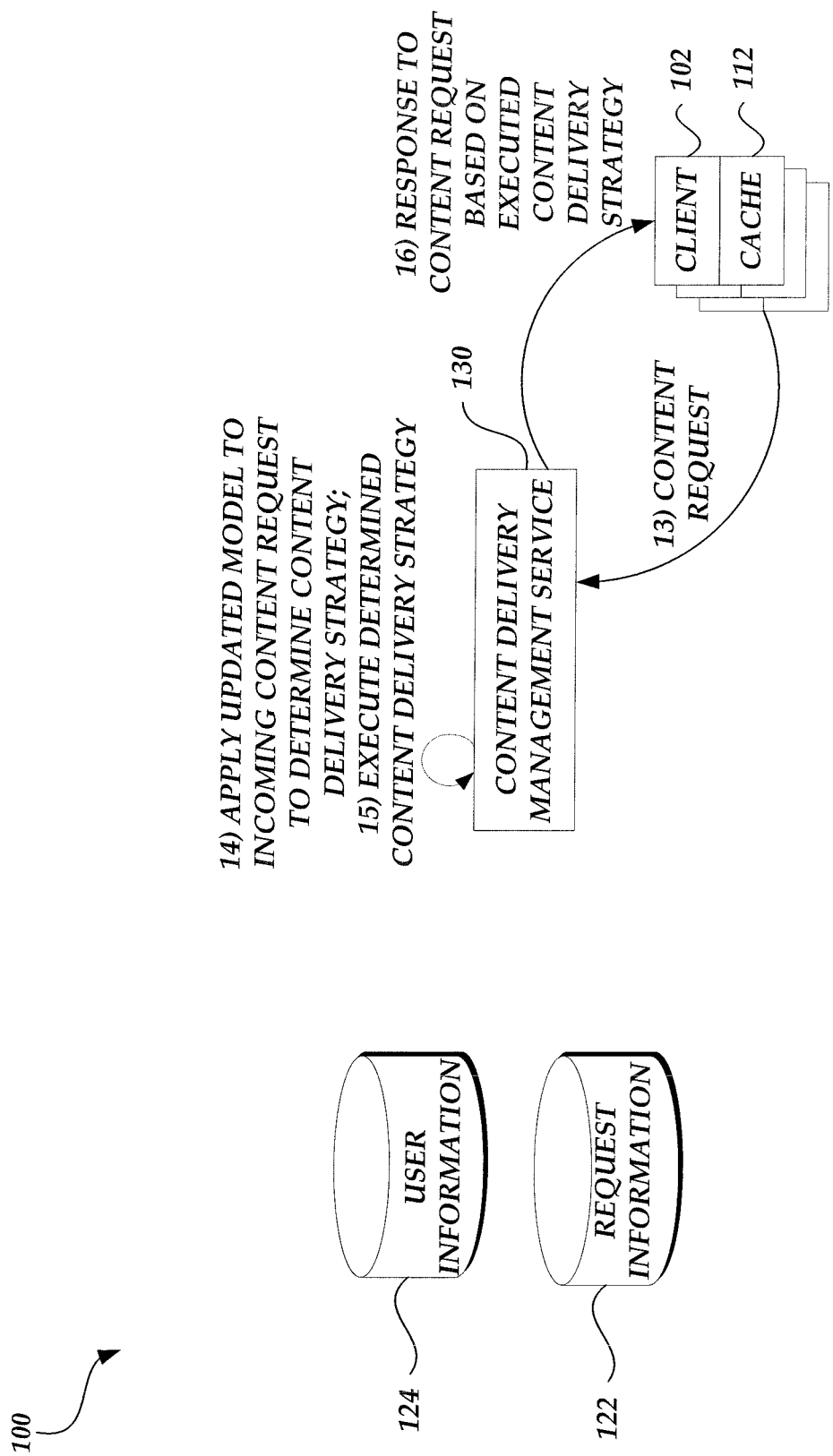

FIGS. 5A-5C are simplified block diagram of the content delivery environment 100 of FIG. 1 illustrating the processing of content requests as managed by the content delivery management service 130. With reference to FIG. 5A, at (1), the content delivery management service 130 obtains historical data regarding content requests from the request information data store 122. As described above, the historical data can include any attributes or aspects related to content requests, including derived content strategy component information and content delivery performance information. The historical data may be in a form of raw system logs with time stamps. Alternatively or in addition, the historical data may be organized and searchable based on the various attributes about individual content requests. At (2), the content delivery management service 130 obtains user data that is applicable to the historical content requests. As described above, the user data may include any information related to users associated with the content provider 104. Where applicable, the content delivery management service 130 may correlate applicable user data with at least a subset of the historical content requests.

At (3), the content delivery management service 130 builds one or more models for determining content delivery strategies in response to content requests. Various supervised machine learning methods (e.g., decision trees, artificial neural networks, logistic regression, support vector machine, etc.) can be employed to build the model. The content delivery management service may decide to use a subset of the historical data obtained from the request information data store 122 and user information data store 124 as basis for training data for a specific model. The training data needs to be representative of real-world use of a function (e.g., to predict a defined content delivery performance measure or to determine an ATF configuration based on content request attributes and a proposed content delivery strategy) corresponding to the model.

Thus, input features and outputs are determined for each content request referenced by the training data. For example, input features corresponding to each content request can include a vector of any combination of attributes derived from the content requests data or applicable user data related to the content request, and another vector of any combination of content delivery strategy components derived from processing information or responses to the content request. Outputs correspond to the same content request may include any defined metrics for measuring content delivery performance, such as a weighted average of user perceived latency and user's purchase propensity corresponding to the content request, which can be further modified by other values related to a type of content, a type of client computing device, a geographic region, combinations of the same, or the like. The outputs may also include indications of ATF configurations derived from user interaction data related to a response to the content request, such as identification of a portion of rendered content as ATF and a confidence level associated with the ATF configuration. The confidence level can be defined based on a type, quantity or consistency of user interactions with the portion of rendered content.

The content delivery management service 130 then determines the type and structure of the model. For example, the content delivery management service 130 may choose decision trees or artificial neural networks as the model type. The content delivery management service 130 may further determine the order of levels for a decision tree model or the structure of layers for a neural network model. In some embodiments, the structure of the model is designed to facilitate determination of model portions that can be provided to and executed locally on clients 102. For example, the upper levels of a decision tree may correspond to decision nodes based on input features generated by or accessible to clients 102. As another example, portions of input layer of an artificial neural network may be designed to only receive input features generated by or accessible to clients 102.

Next, the content delivery management service 130 trains the model by running learning algorithms corresponding to the model on the training data. In some embodiments, the accuracy of the trained model is evaluated on test data, such as another subset of the historical data obtained from the request information data store 122 and user information data store 124, before the model is deployed. As described above, a trained model may take a content request (as represented by a vector of various features related to the content request) and a candidate content delivery strategy (as represented by a vector of various content delivery strategy components) as input and generate one or more predicted content delivery performance metrics and/or indications of ATF configurations.

At (4), the content delivery management service 130 obtains a new content request that originated from a client 102. Illustratively, the client 102 may generate the request for content by loading a browser for viewing network content in response to an event or user action. The browser may be implemented to request network resource via a browse session request to the network content provider 104. Once the request is received by a component of the network content provider 104, the request can be forwarded to the content delivery management service 130. In some embodiments where a portion of the model is executed locally on the client 102, the newly obtained content request may include outputs from the locally executed model portion. Illustratively, such information can be included in the header or parameters of the content request.

At (5), the content delivery management service 130 applies the trained model to the incoming content request in order to determine a proper content delivery strategy and/or ATF configuration. The content delivery management service may feed the model with at least some known attributes associated with an incoming content request as one part of input, and feed the model with at least some known components corresponding to a candidate content delivery strategy as another part of the input, and retrieve one or more performance predictions and/or indications of ATF configurations. Depending on the model, training data, or training method employed, unknown input features can be assigned a neutral value or simply be left blank.

The content delivery management service 130 may apply the model to the incoming content request in conjunction with a set of candidate strategies, compare the predictions made by the model among candidate strategies, and select a strategy that yields a best predicted performance. In some cases, the set of candidate content delivery strategies may include different combinations of strategy components that are correlated with similar content requests in the training data. For example, content requests submitted by older smartphones via relatively slow networks may typically be correlated with responses including in-lining of resources, low quality data formats, exclusion of certain types of features, combinations of the same, or the like.

At (6), once a content delivery strategy (possibly including an ATF configuration) is determined or selected, the content delivery management service 130 executes the strategy, for example, by identifying a pre-generated response to the content request that corresponds to the strategy, dynamically generating HTML documents in accordance with the strategy, causing content serving devices to pre-cache certain network resources accordingly, routing the request to a corresponding content server, combinations of the same, or the like.

At (7), the content delivery management service 130 may transmit a response to the client 102. The response, such as an HTML file, may include information that causes the client 102 to perform further steps in accordance with the content delivery strategy. In some embodiments, the content delivery management service 130 may also incorporate a determined portion of the trained model in the response (e.g., as script code to be executed within a browser or a separate application to be installed on the client 102).

With reference to FIG. 5B, at (8), the client 102 performs actions in accordance with information (e.g., script codes, dependency graphs, etc.) included in the received response, such as requesting embedded resources from CDN service providers based on an associated order or priority, pre-fetch content in anticipation of future requests, implementing the provided model portion, etc.

At (9), the content delivery management service 130 obtains feedback data of content delivery performance related to the executed strategy from the client 102 or other sources. The feedback data may be transmitted from the client 102 to the content delivery management service 130 directly. Alternatively or in addition, the feedback data may be transmitted to other components of the content provider 104 and maintained by the request information data store 122 or user information data store 124. As described above, the content delivery performance feedback data may include various performance metrics about content delivery (e.g., network statistics, latencies, bandwidths, data arrival times, such as the timing of receipt of first and last packets of information for the requested resource and each embedded resource, timing information associated with processing executable resources, such as JavaScript, as well as additional information that can be used to indirectly determine processing times associated with the execution of the resources) in response to content requests. The content delivery performance feedback data may also include user interaction data or valuation (e.g., purchase actions, Web browsing actions, search actions, updated purchase propensity values, etc.)

At (10), the content delivery management service 130 obtains updated content request data (e.g., data about more recent content requests, such as the most recent 60 days) from the request information data store 122. At (11), the content delivery management service 130 obtains updated user data that is applicable to the updated content request data from the user information data store 124. At (12), the content delivery management service 130 updates the model based on the feedback data and updated data regarding more recent content requests, for example, by re-training the model with these data. Similarly, the model updating can be performed periodically (e.g., every 30 days) or based on a condition (e.g., when a content delivery performance metric value falls below a predetermined threshold).

With reference to FIG. 5C, at (13), the content delivery management service 130 obtains a new content request in a way similar to (4). At (14), the content delivery management service 130 applies the updated model to the new content request in order to determine a proper content delivery strategy and/or ATF configuration. Again, this can be performed in a way similar to (5). At (15), the content delivery management service 130 executes the determined strategy in a way similar to (6), and at (16) the content delivery management service 130 transmits a response to the client 102 in accordance with the strategy similarly to what was performed in (7). In some embodiments, the response may include update information for a model portion currently executing on the client 102. In other embodiment, the response may provide a second model portion to the client 102 to execute locally in conjunction with other portion(s) currently executing on the client 102.

Figure 6:
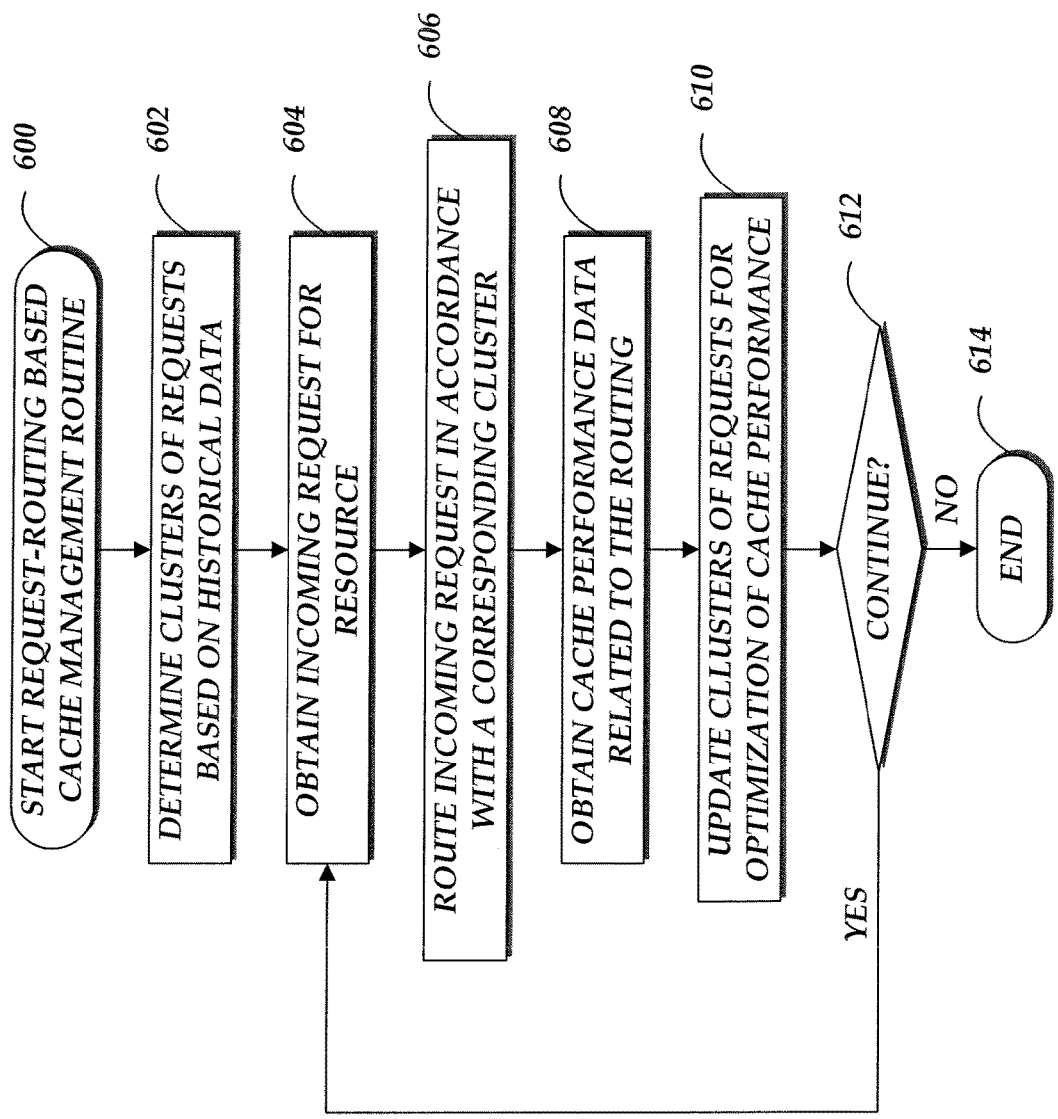
FIG. 6 is a flowchart illustrative of a request-routing based cache management routine implemented by the cache management service.

FIG. 6 is a flowchart illustrative of a request-routing based cache management routine implemented by the cache management service 120. The routine starts at block 600. At block 602, the cache management service 120 determines clusters or groups of content requests based on historical data. Illustratively, the cache management service 120 clusters or groups historical content requests based on various attributes or features associated with them. Various computational, statistical, or machine learning methods (e.g., k-means, mixture models, hierarchical clustering, or other unsupervised clustering or classification algorisms) can be employed to group or categorize the content requests so that each group may be associated with dedicated content serving devices, such as content servers 113 associated with the content provider 104, CDN POPs 115 associated with the CDN service provider 106, or clients 102. Individual content requests can be represented by any combination of attributes or features related to the content request, for example, in the form of a vector, and fed into an applicable clustering algorithm to generate the clusters.

In some embodiments, the clustering algorithm includes one or more criteria for clustering the content requests. For example, a criterion may correspond to a formula for calculating a measure of similarity between or among content requests. Illustratively, the formula may include heuristics related to cache performance of content serving devices associated with the content provider 104, CDN service provider 106, or clients 102. For example, content requests may be considered similar if the content requests include a same requested resource, are submitted by clients within a same geographic region, a same network domain or through a same Internet service provider (ISP), relate to users of similar income level or purchase interests, are transmitted within a window of date or time, combinations of the same, or the like.

Based on the one or more criteria for request clustering, the cache management service 120 determines multiple clusters of the historical content requests. Depending on the clustering algorithm employed, these clusters can be mutually exclusive, overlapping, forming a hierarchical relationship, or probabilistic. The cache management service 120 then associates content serving computing devices with each of the clusters. The association may correspond to a one-to-one, one-to-many, many-to-one, or many-to-many relationship. Characteristics can be derived from clusters to facilitate their association with content serving devices. For example, if a cluster of requests mostly originated from clients located within a specific geographic region, the cache management service 120 may associate the cluster with a CDN POP 115 located in the same region. As another example, the variety and size of content requested by a cluster may inform the type of content serving devices (e.g., having a larger or smaller cache capacity) to be associated with the cluster.

Characteristics of content request clusters may also be used by the cache management service 120 to instruct or otherwise cause content serving devices to pre-cache content. For example, if a cluster of requests generally corresponds to requests submitted upon occurrence of certain events (e.g., requests of a cluster are typically submitted one day after certain items are added to online shopping carts), the cache management service 120 may cause content service devices associated with the cluster to pre-cache at least a portion of content requested by the cluster when the event is detected again.

At block 604, the cache management service 120 obtains a new incoming content request originated from a client 102. Illustratively, the client 102 may generate the request for content by loading a browser for viewing network content in response to an event or user action. The browser may be implemented to request network resource via a browse session request to the network content provider 104. Once the content request is received by a component of the network content provider 104, the request can be forwarded to the cache management service 120.

At block 606, the cache management service 120 routes the incoming content request in accordance with a corresponding cluster of historical content requests. For example, the cache management service 120 may compute a similarity measure for each cluster with respect to the income content request based, for example, on the same similarity formula used to cluster historical content requests. The cache management service 120 may further compute a respective confidence level for matching individual clusters with the incoming request based on how similar the cluster is to the incoming request. In some embodiments, the cache management service 120 always assigns the incoming content request to a cluster with the highest confidence level. In other embodiments, the cache management service 120 probabilistically assigns the incoming content request to individual clusters based on their respective confidence levels.

The cache management service 120 then routes the incoming request to a content serving computing device (e.g., a content server 113, a CDN POP 115, or the requesting client 102) that are associated with the cluster assigned to the incoming request. This can be achieved by DNS resolution, URL modification, or other request routing techniques known in the art. In some embodiments, the cache management service 120 may associate additional content serving devices to a cluster that matches the incoming content request. For example, the cache management service 120 may determine that the content serving devices currently associated with the matching cluster lacks capacity to handle some content requests routed thereto. In this case, the cache management service 120 may assign additional server(s) to be associated with the cluster and route the incoming content request to the additional server.

At block 608, the cache management service 120 obtains feedback data of cache performance related to the routing of the incoming request. The feedback data may be transmitted from the content serving devices to the cache management service 120 directly. Alternatively or in addition, the feedback data may be transmitted to another component of the content provider 104 and then maintained by the request information data store 122. As described above, the cache performance feedback data may include performance metrics about cache components (e.g., cache hit/miss rate) or performance metrics about content delivery (e.g., latency information) in response to content requests.

At block 610, the cache management service 120 updates the clusters of content requests for optimization of cache performance of content serving devices managed by the service. The cache management service 102 may retrieve updated content request and user data (e.g., data related to more recent content requests) from the request information data store 122 and the user information data store 124. The cache management service 120 may then update the clustering of content requests based on the feedback data of cache performance and updated data regarding more recent content requests. In some embodiments, the cache management service 120 may define a metric to measure cache performance (e.g., a weighted average of cache hit rate and user's perceived latency).

Using the defined cache performance metric, the cache management service 120 may assess cache performance of content serving devices that are associated with previously determined clusters. The cache management service 120 may compare clusters that correspond to high values in cache performance with those that correspond to low values, and then determine which features or measurement of similarities between content requests contribute more to the formation of high (or low) performing clusters. The cache management service 120 may then adjust the criteria, such as changing a similarity formula to discount factors that contribute to formation of low performance clusters while amplifying factors that contribute to formation of high performance clusters, so that high performing clusters are more likely to occur through the clustering process.

The adjusted criteria can be used to cluster the more recent content requests. Accordingly, the cache management service 120 determines a set of updated clusters of content requests and then re-associates content serving devices with each of the updated clusters, which are likely to achieve better cache perform than with the clusters previously determined. The updating of clustering criteria and re-generation of content requests clusters can be performed periodically (e.g., every week) or based on a condition (e.g., a cache performance metric value starts to decline).

At block 612, the cache management service 120 determines whether to continue the request-routing based cache management routine. If the routine is to continue, it proceeds to block 604 where the cache management service 120 obtains additional incoming content requests. Otherwise, the routine ends at block 614.

Figure 7:
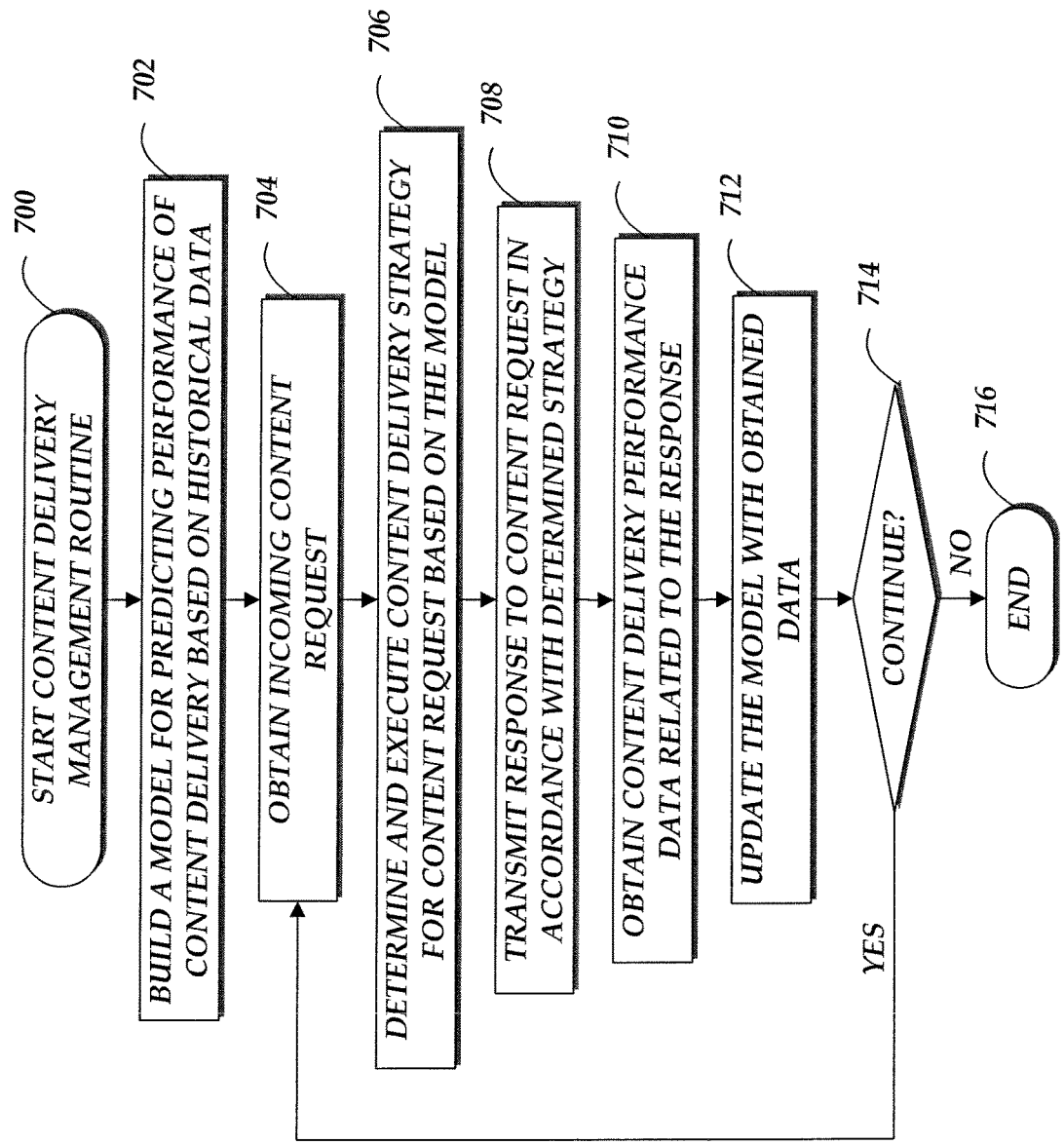
FIG. 7 is a flowchart illustrative of a content delivery management routine implemented by the content delivery management service.

FIG. 7 is a flowchart illustrative of a content delivery management routine implemented by the content delivery management service 130. The routine starts at block 700. At block 702, the content delivery management service 130 builds a model for predicting performance of content delivery based on historical data related to content requests. Illustratively, the historical data can include any information related to receiving, processing, and responding to content requests directed to the content provider 104 or an associated CDN service provider 106 over a specified period of time (e.g., for the past 2 weeks.) As describe above, the model can be trained on at least a portion of the historical data, so that after the training, the model may take a content request (as represented by a vector of various features related to the content request) and a candidate content delivery strategy (as represented by a vector of various content delivery strategy components) as input and generate one or more predicted content delivery performance metrics as output. The output content delivery performance metrics may include predicted values corresponding to network statistics, latencies, bandwidths, data arrival times for requested resource and each embedded resource, timing associated with processing executable resources, probability of generic or specific purchase actions, Web browsing actions, or search actions, combination of the same, or the like.

At block 704, the content delivery management service 130 obtains an incoming content request that originated from a client 102. Illustratively, the client 102 may generate the request for content by loading a browser for viewing network content in response to an event or user action. At block 706, the content delivery management service 130 determines and executes a content delivery strategy in response to the incoming content request based on the trained model. As described above, the content delivery management service 130 may feed the model with at least some known attributes associated with an incoming content request as one part of an input.

The known attributes associated with the incoming content request may be derived from the request itself or from other data related to the incoming content request. For example, the user associated with the incoming content request may have logged in its account with the content provider 104 and therefore any applicable user information, such as demographics, purchase history, review history, etc., can be derived as input features. As another example, previous content requests originated from the same client 102 can be identified based on IP address, session ID or other identification methods, which may be basis for other applicable input features.

The content delivery management service 130 may feed the model with at least some known components of a candidate content delivery strategy as another part of the input. The model will then generate the one or more performance predictions for applying the candidate strategy in response to the incoming content request. The content delivery management service 130 may apply the model to the incoming content request in conjunction with a number of candidate strategies, compare the predictions made by the model with respect to each candidate strategy, and select a strategy that yields a best predicted performance metric that the content provider 104 is set to optimize. For example, the performance metric may correspond to one of the outputs of the model, such as user's perceived latency. As another example, the performance metric may correspond to a formula that combines a number of model outputs, such as a weighted average of certain latency metrics and user valuation metrics.

Once the content delivery strategy is determined, the content delivery management service 130 executes the strategy, for example, by identifying a pre-generated response to the content request that corresponds to the strategy, dynamically generating HTML documents in accordance with the strategy, causing content serving devices to pre-cache certain network resources accordingly, routing the request to a corresponding content server, combinations of the same, or the like.

At block 708, in accordance with the content delivery strategy, the content delivery management service 130 may transmit a response to the content requesting device, such as client 102. The response, such as an HTML file, may include information that causes the client 102 to perform further steps in accordance with the content delivery strategy. At block 710, the content delivery management service 130 obtains feedback data of content delivery performance related to the executed strategy from the client 102 or other sources. The feedback data may be transmitted from the client 102 to the content delivery management service 130 directly. Alternatively or in addition, the feedback data may be transmitted to other components of the content provider 104 and then forwarded to or retrieved by the content delivery management service 130. The content delivery performance feedback data may include any information related to content requests, responses, or users as described herein. For example, the feedback data can include various performance metrics about content delivery, user action or valuation resulted from the executed content delivery strategy.

At block 712, the content delivery management service 130 updates the model. Illustratively, the content delivery management service 130 re-trains the model based on updated content request data (e.g., data about more recent content requests), updated user data, and the feedback data of content delivery performance. At block 714, the content delivery management service 130 determines whether to continue the routine. If so, the routine proceeds to block 704. If not, the routine terminates at block 716.

Figure 8:
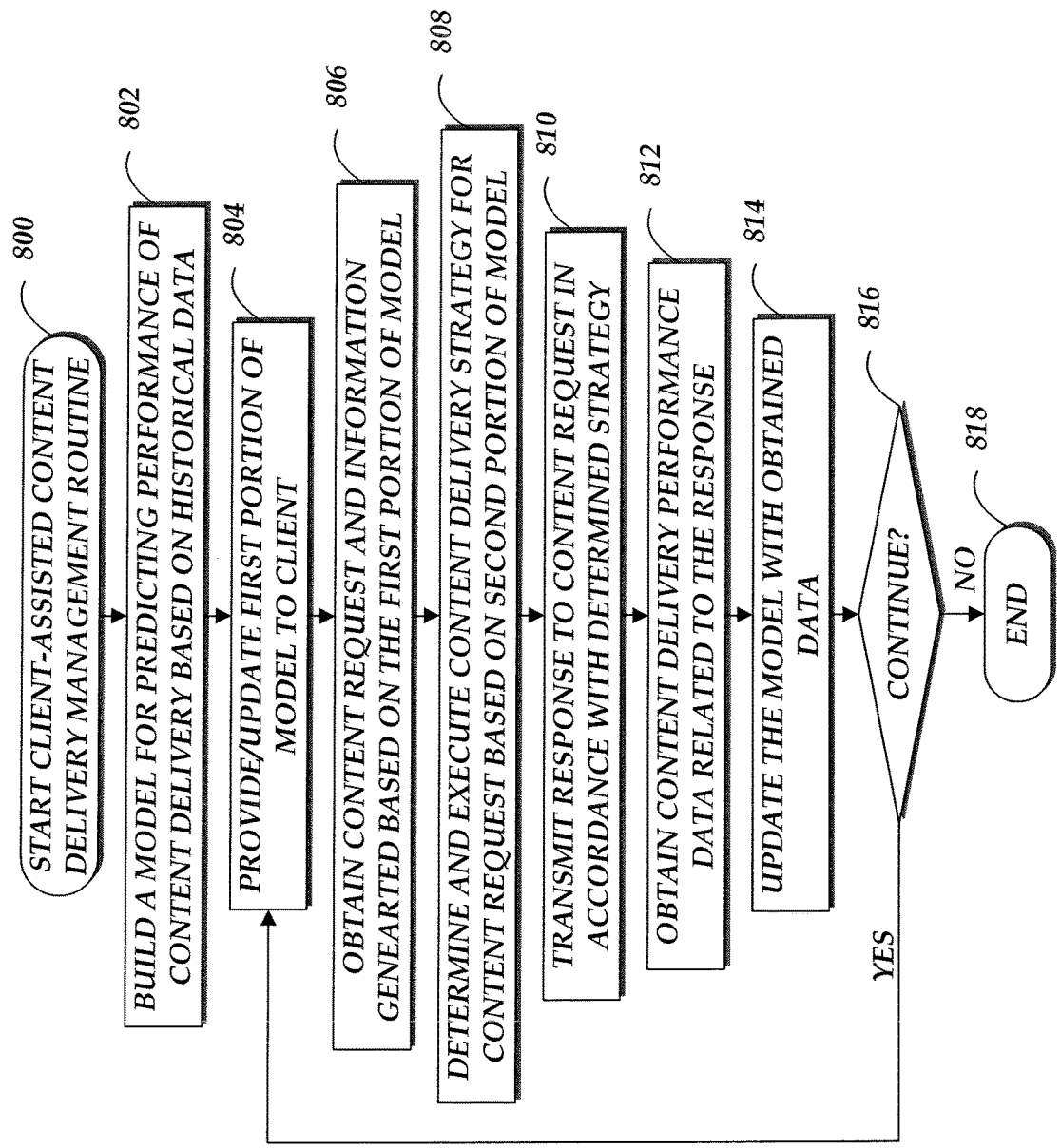
FIG. 8 is a flowchart illustrative of a client-assisted content delivery management routine implemented by the content delivery management service.

FIG. 8 is a flowchart illustrative of a client-assisted content delivery management routine implemented by the content delivery management service 130. The routine starts at block 800. At block 802, the content delivery management service 130 builds a global model for predicting performance of content delivery based on historical data related to content requests. The content delivery management service 130 may determine a type and structure of the global model so that the global model can be divided in to portions or sub-models each having their respective inputs and outputs. For example, the content delivery management service 130 may choose decision trees as the type of the global model, and may further specify that decisions nodes above a certain level of the decision tree must correspond to input features generated by or accessible to clients 102. As another example, the content delivery management service 130 may choose artificial neural networks as the type of the global model, and design certain input layer portions of the neural network in a way to only receive input features generated by or accessible to clients 102.

At block 804, after the global model is trained, the content delivery management service 130 may provide a determined portion of the model (e.g., certain upper levels of a decision tree or portion of a neural network's input layer) to a client 102. Different portions of the global model can be provided to different clients 102, and in some cases, a large portion provided to a client with adequate computing capability or data accessibility may include a number of smaller portions provided to other clients. The model portion can be embodied in a separate application or script code to be executed locally on the client 102. In some embodiments, the model portion is trained and/or updated locally on the client 102. In other embodiments, the model portion may receive input features accessible to the client 102 exclusively, such as a quantity or type of other contents the client 102 is requesting, rendering or presenting, available computational or networking resources, user interactions with other applications, etc. If the client 102 is currently executing a portion of the global model, the content delivery management service 130 may provide update information regarding the portion based on the newly trained global model.

At block 806, the content delivery management service 130 obtains a new content request that originated from a client 102. The newly obtained content request includes outputs from the model portion executed locally on the client 102. For example, such information can be included in the header or parameters of the content request. At block 808, the content delivery management service 130 determines and executes content delivery strategy in response to the content request based on another portion of the global model. For example, the content request may indicate a location of the locally executed model portion within the global model. Alternatively or in addition, the content delivery management service 130 may determine that outputs from the model portion executed on the client 102 corresponds to inputs to another specific portion of the global model utilized by the content delivery management service 130.

In some embodiments, the outputs from the model portion executed on the client 102 include at least some content delivery strategy components and therefore dictate or limit the type of candidate content delivery strategies that can be evaluated by the global model. The content delivery management service may feed the outputs where appropriate into the overall model and possibly feed the global model with other applicable input features, and retrieve one or more performance predictions from the model. As described above, the content delivery management service 130 may determine a strategy based on the predictions and execute the strategy, which may include determining whether the model portion executing on the client 102 should be updated, replaced, or otherwise modified.

At block 810, in accordance with the content delivery strategy, the content delivery management service 130 may transmit a response to the client 102. The response may include another determined portion of the global model or updating information for the model portion currently executing on the client 102 in the response. At block 812, the content delivery management service 130 obtains feedback data of content delivery performance related to the executed strategy from the client 102 or other sources. The content delivery performance feedback data may include any information related to content requests, responses, or users as described herein. For example, the feedback data can include various performance metrics about content delivery, user action or valuation. At block 814, the global model is updated, for example, by re-training the model with the updated data related to more recent content requests and the feedback data. At block 816, the content delivery management service 816 determines whether or not to continue the routine. If the routine is to continue, the routine proceeds to block 804. Otherwise, the routine ends at block 818.

Figure 9:
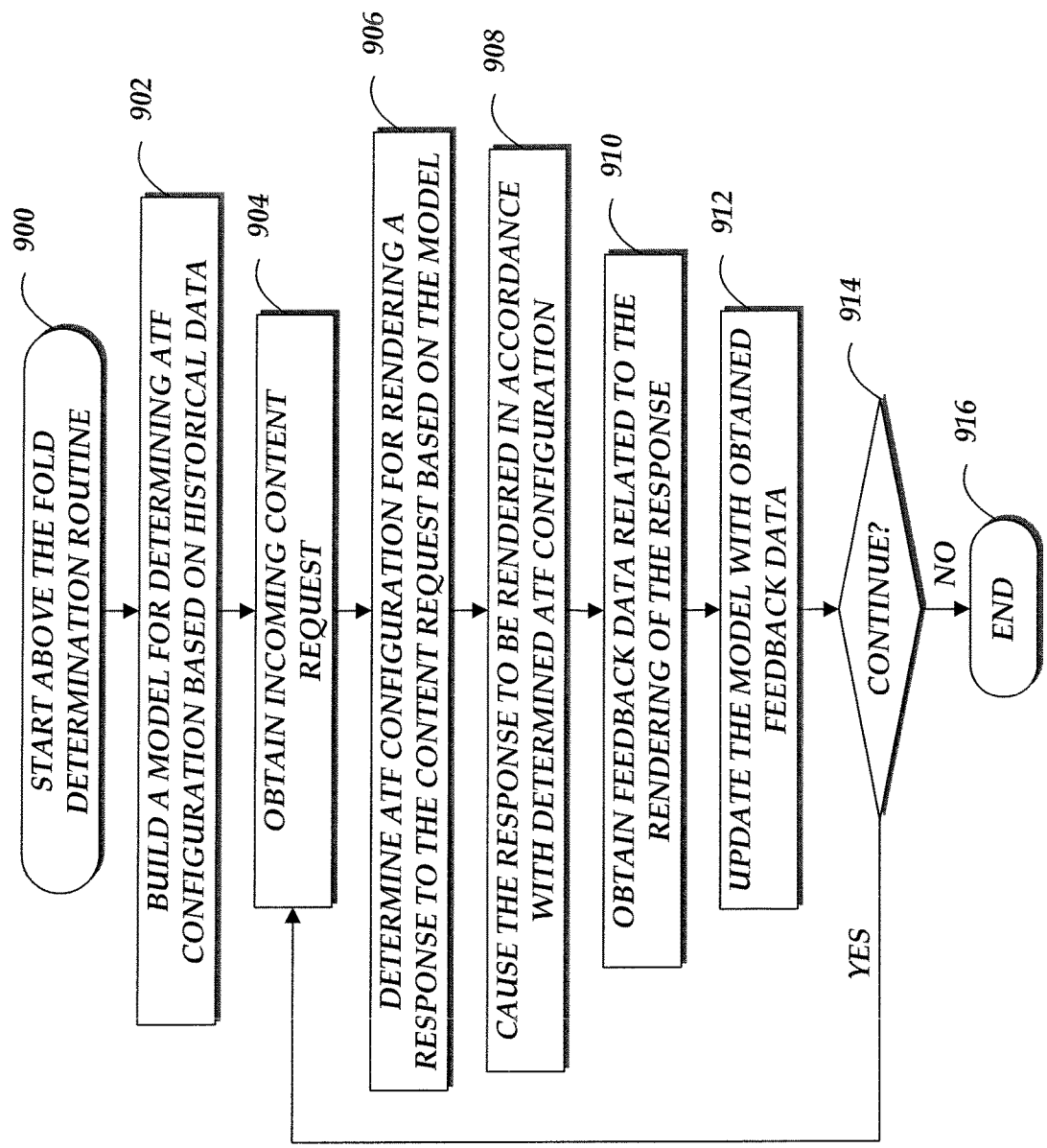
FIG. 9 is a flowchart illustrative of an above the fold determination routine implemented by the content delivery management service.

FIG. 9 is a flowchart illustrative of an above the fold determination routine implemented by the content delivery management service 130. The routine starts at block 900. At block 902, the content delivery management service 130 builds a model for determining an ATF configuration for rendering responses to content requests. As describe above, the model can be built based on historical data related to content requests. The content delivery management service may decide to use a subset of the historical data as basis for training data for a specific model. The training data needs to be representative of real-world use of a function (e.g., to determine one or more indications of ATF configurations for content rendering based on content request attributes and content delivery strategy components) corresponding to the model.

Thus, input features and outputs are determined for each content request within the training data. For example, input features corresponding to each content request can include a vector of any combination of attributes derived from the content requests data or applicable user data related to the content request, as well as another vector of content delivery strategy components derived from processing information or responses to the content request. Outputs may include indications of ATF configurations derived from user interaction data related to responses to the content request.

For example, user interactions (e.g., clicking or dragging items, inputting information, etc.) with certain types of features within a Web page may be considered an indication the type of features should be included in the ATF. As another example, user scrolling away from a current ATF immediately after its rendering may indicate that the current ATF configuration is inappropriate. As a further example, user scrolling away from a portion of rendered content and dwelling on another portion for an extended period of time may be considered an indication that the later portion should be displayed as ATF. Still further, the indications of ATF configuration can be associated with respective confidence levels, which can be defined based on a type, quantity or consistency of user interactions. Next, the content delivery management service 130 trains the model by running learning algorithms corresponding to the model on the training data. As described above, the trained model may take a content request (as represented by a vector of various features related to the content request) and a candidate content delivery strategy (as represented by a vector of various content delivery strategy components) as input and generate one or more indications of ATF configurations for rendering a corresponding response to the content request.

At block 904, the content delivery management service 130 obtains a new content request that originated from a client 102. Illustratively, the client 102 may generate the request for content by loading a browser for viewing network content in response to an event or user action. At block 906, the content delivery management service 130 applies the trained model to the incoming content request in order to determine a proper ATF configuration for content rendering in its response. As described above, the content delivery management service may feed the model with at least some known attributes associated with an incoming content request as one part of input, and feed the model with indications of at least some components of a content delivery strategy as another part of the input, and retrieve one or more indications of ATF configurations for applying the strategy in response to the incoming content request. The content delivery management service 130 may select an ATF configuration based on its associated confidence level as compared to other ATF configurations. In accordance with the chosen ATF configuration, the content delivery management service 130 may determine priorities associated with various features or resources embedded in the response to the content request.

At block 908, the content delivery management service 130 causes the response to the content request to be rendered on the client 102 in accordance with the determined ATF configuration. For example, the content delivery management service may incorporate additional information (e.g., script codes, dependency graphs, etc.) in the response transmitted to the client 102, so that the client 102 retrieves embedded resources from the content provider 104 or CDN service provider 106 based on their associated priorities and renders or displays content in accordance with the ATF configuration.

At block 910, the content delivery management service 130 obtains feedback data related to the response as rendered in accordance with the ATF configuration from the client 102 or other sources. The feedback data may include any information related to content requests, responses, or users as described herein. For example, the feedback data can include any user interaction data, such as changes of user preferences or settings. The feedback data may also include corresponding user valuation data, such as updated purchase propensity values.

At block 912, the content delivery management service 130 updates the model based on the feedback data as well as updated data related to more recent content requests. As describe above, the model updating can be achieved by re-training the model with the updated data. Similarly, the model updating can be performed periodically (e.g., every 30 days) or based on a condition derived from the feedback data. At block 914, the content delivery management service 130 determines whether to continue the routine. If so, the routine proceeds to block 904. Otherwise, the routine terminates at block 916.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Embodiments of the disclosure can be described in view of the following clauses:

Clause 1: A computer-implemented method for facilitating content delivery, the computer-implemented method comprising:
  under control of a hardware computing device configured with specific computer executable instructions,
    obtaining first data characterizing individual requests of a plurality of content requests over a specified period of time;
    obtaining second data characterizing content delivery strategy in response to individual requests of the plurality of content requests;
    obtaining third data characterizing content delivery performance in response to individual requests of the plurality of content requests;
    building a machine learning model for predicting content delivery performance, wherein the machine learning model is trained, at least in part, on the first, second and third data;
    obtaining a target content request from a user computing device;
    determining a predicted content delivery performance for applying a target content delivery strategy in response to the target content request based, at least in part, on the machine learning model; and
    if the predicted content delivery performance satisfies a predetermined condition:
      generating a response to the target content request in accordance with the target content delivery strategy; and
      transmitting the generated response to the user computing device.

Clause 2: The computer-implemented method of Clause 1, wherein the first data includes at least one of a type of requested resource, request timing information, associated network condition or topology, characteristics of requesting devices, or associated location information.

Clause 3: The computer-implemented method of Clauses 1 and 2, wherein the second data includes at least one of inclusion or exclusion of features, lazy-loading or prefetching of resources, in-lining or external calls for resources, low quality or high quality data formats, associated dependency graphs, above-the-fold information, or request routing information.

Clause 4: The computer-implemented method of Clauses 1 to 3, wherein the third data includes at least one of a total time to load a content page or individual network resources, number of times the content page or individual network resources was retrieved, bandwidth utilization, network latency, number of hops between client and server, processor utilization, memory utilization, cache hit or miss ratio, or load time per cache miss.

Clause 5: The computer-implemented method of Clauses 1 to 4, wherein the predicted content delivery performance includes a predicted valuation of a user associated with the target content request.

Clause 6: A computer-implemented method comprising:
under control of a hardware computing device configured with specific computer executable instructions,
obtaining a machine learning model for predicting content delivery performance based on information related to content requests and content delivery strategies;
generating a prediction of content delivery performance by providing the obtained machine learning model with at least one attribute of a first content request or at least one portion of a first content delivery strategy; and
if the prediction of content delivery performance satisfies a predetermined condition, implementing the first content delivery strategy in response to the first content request.

Clause 7: The computer-implemented method of Clause 6, wherein the first content delivery strategy includes at least one of inclusion or exclusion of a feature, lazy-loading or prefetching of a resource, in-lining or external call for a resource, data format, dependency graph, above-the-fold configuration, or routing of a request.

Clause 8: The computer-implemented method of Clauses 6 and 7, wherein the at least one attribute of the first content request corresponds to information related to a user associated with the first content request.

Clause 9: The computer-implemented method of Clause 8, wherein the information related to the user includes at least one of user demographics, cultural preferences, geographic location, occupation, income, spending levels, content interests, hobbies, preferences, settings, purchase histories, Web browsing histories, search histories, session tracking histories, user interaction data, ownership or rental lists, or user reviews.

Clause 10: The computer-implemented method of Clauses 6 to 9 further comprising obtaining content delivery performance data that corresponds to the implementation of the first content delivery strategy in response to the first content request.

Clause 11: The computer-implemented method of Clause 10 further comprising causing updating of the machine learning model based, at least in part, on the obtained content delivery performance data.

Clause 12: A system comprising:
a data store configured to at least store computer-executable instructions; and
a hardware processor in communication with the data store, the hardware processor configured to execute the computer-executable instructions to at least:
obtain a machine learning model for predicting content delivery performance based on information related to content requests and content delivery strategies;
generate a first prediction of content delivery performance by providing the obtained machine learning model with at least one attribute of a first content request or at least one portion of a first content delivery strategy; and
if the first prediction of content delivery performance satisfies a predetermined condition, implement the first content delivery strategy in response to the first content request.

Clause 13: The system of Clause 12, wherein the machine learning model is trained on historical data regarding content requests over a specified period of time.

Clause 14: The system of Clause 13, wherein the hardware process is further configured to at least determine the first content delivery strategy based, at least in part, on a correlation between content requests and content delivery strategies derived from the historical data.

Clause 15: The system of Clauses 12 to 14, wherein the hardware processor is further configured to at least generate a second prediction of content delivery performance by providing the obtained machine learning model with at least one portion of a second content delivery strategy.

Clause 16: The system of Clause 15, wherein the predetermined condition includes a comparison between the first and second predictions.

Clause 17: A non-transitory computer readable storage medium storing computer executable instructions that when executed by a processor perform operations comprising:
obtaining a machine learning model for predicting content delivery performance based on information related to content requests and content delivery strategies;
generating a prediction of content delivery performance by providing the obtained machine learning model with at least one attribute of a first content request or at least one portion of a first content delivery strategy; and
if the prediction of content delivery performance satisfies a predetermined condition, implementing the first content delivery strategy in response to the first content request.

Clause 18: The non-transitory computer-readable storage medium of Clause 17, wherein the machine learning model corresponds to a decision tree model or an artificial neural network model.

Clause 19: The non-transitory computer-readable storage medium of Clauses 17 and 18, wherein implementing the first content delivery strategy comprises at least one of identifying a pre-generated response, dynamically generating HTML documents, causing content serving devices to pre-cache a network resource, or routing the first content request to a corresponding content serving device, in accordance with the first content delivery strategy.

Clause 20: The non-transitory computer-readable storage medium of Clauses 17 to 19, wherein the operations further comprise obtaining an updated machine learning model, wherein the updated machine learning model is trained on at least a portion of content delivery performance data corresponding to the implementation of the first content delivery strategy in response to the first content request.

Clause 21: The non-transitory computer-readable storage medium of Clause 20, wherein the operations further comprise implementing a second content delivery strategy in response to a second content request based, at least in part, on the updated machine learning model.

Clause 22: A computer-implemented method for facilitating content delivery, the computer-implemented method comprising:
under control of a hardware computing device configured with specific computer executable instructions,
obtaining data regarding a first plurality of requests for network resources over a specified period of time;
clustering the first plurality of requests based, at least in part, on a similarity measure related to cache performance of a plurality of content serving computing devices, wherein individual clusters of the first plurality of requests are associated with one or more content serving computing devices of the plurality of content serving computing devices;
obtaining a target request for a network resource;
determining a cluster of the first plurality of requests that corresponds to the obtained target request; and
routing the target request to one or more content serving computing devices associated with the determined cluster of the first plurality of requests.

Clause 23: The computer-implemented method of Clause 22 further comprising:
obtaining cache performance data corresponding to the routing of the target request; and
updating the similarity measure based, at least in part, on the obtained cache performance data.

Clause 24: The computer-implemented method of Clause 23 further comprising:
obtaining data regarding a second plurality of requests for network resources; and
clustering the second plurality of requests based, at least in part, on the updated similarity measure, wherein individual clusters of the second plurality of requests are associated with one or more content serving computing devices of the plurality of content serving computing devices.

Clause 25: The computer-implemented method of Clause 24 further comprising:
obtaining data regarding a second target request for a network resource; determining a cluster of the second plurality of requests that corresponds to the obtained target request; and
routing the second target request to one or more content serving computing devices associated with the determined cluster of the second plurality of requests.

Clause 26: The computer-implemented method of Clauses 22 to 25, wherein the data regarding the first plurality of requests includes at least one of a type of requested resource, timing of request, associated network condition or topology, characteristics of requesting device, or associated location information.

Clause 27: A computer-implemented method comprising:
under control of a hardware computing device configured with specific computer executable instructions,
obtaining a plurality of groups of requests for network resources, wherein individual groups of the plurality of groups are associated with one or more content serving computing devices of a plurality of content serving computing devices and wherein the plurality of groups are determined based, at least in part, on a criterion related to cache performance of the plurality of content serving computing devices; and
determining a first group of the plurality of groups of requests for a target request for a network resource, wherein the target request is routed to one or more content serving computing devices associated with the determined first group.

Clause 28: The computer-implemented method of Clause 27 further comprising:
determining a second group of the plurality of groups of requests for the target request, wherein the determinations of the first and second groups are associated with respective confidence levels; and
probabilistically associating the target request with the first group based, at least in part, on the confidence levels associated with the determinations of the first and second groups.

Clause 29: The computer-implemented method of Clause 28, wherein the confidence level associated with the determination of the second group is greater than the confidence level associated with the determination of the first group.

Clause 30: The computer-implemented method of Clauses 27 to 29, wherein one or more content serving computing devices associated with at least one group of the plurality of groups pre-cache at least a portion of content that is commonly requested by the at least one group of requests.

Clause 31: The computer-implemented method of Clauses 27 to 30, wherein at least two groups of requests of the plurality of groups include common requests for network resources.

Clause 32: A system comprising:
a data store configured to at least store computer-executable instructions; and
a hardware processor in communication with the data store, the hardware processor configured to execute the computer-executable instructions to at least:
obtain a plurality of groups of requests for network resources, wherein individual groups of the plurality of groups are associated with one or more content serving computing devices of a plurality of content serving computing devices and wherein the plurality of groups are determined based, at least in part, on a criterion related to cache performance of the plurality of content serving computing devices;
determine a first group of the plurality of groups of requests for a target request for a network resource, wherein the target request is routed to one or more content serving computing devices associated with the determined first group.

Clause 33: The system of Clause 32, wherein the one or more content serving computing devices associated with the determined first group retrieves at least a portion of content from a local cache component and transmits the retrieved content in response to the target request.

Clause 34: The system of Clauses 32 and 33, wherein the cache performance is defined based on at least one of a cache hit rate, cache miss rate, or content delivery latency.

Clause 35: The system of Clauses 32 to 34, wherein the hardware processor is further configured to obtain a second plurality of groups of requests for network resources and the second plurality of groups are determined based, at least in part, on a second criterion related to the cache performance of the plurality of content serving computing devices.

Clause 36: The system of Clause 35, wherein a second target request is routed based, at least in part, on the second plurality of groups of requests.

Clause 37: A non-transitory computer readable storage medium storing computer executable instructions that when executed by a processor perform operations comprising:
obtaining an indication of a first group of a plurality of groups of requests for network resources, wherein individual groups of the plurality of groups are associated with one or more content serving computing devices of a plurality of content serving computing devices, wherein the plurality of groups are determined based, at least in part, on a criterion related to cache performance of the plurality of content serving computing devices, and wherein the first group of the plurality of groups is determined as corresponding to a target request for a network resource; and routing the target request to one or more content serving computing devices associated with the first group.

Clause 38: The non-transitory computer-readable storage medium of Clause 37, wherein the plurality of groups of requests are generated based, at least in part, on an unsupervised machine learning method.

Clause 39: The non-transitory computer-readable storage medium of Clauses 37 and 38, wherein individual content serving computing devices of the plurality of content serving computing devices correspond to at least one of a content provider, a CDN service provider, or a user.

Clause 40: The non-transitory computer-readable storage medium of Clause 39, wherein the target request is submitted by the user.

Clause 41: The non-transitory computer-readable storage medium of Clauses 37 to 40, wherein the operations further comprise causing association of at least one additional content serving computing device with the first group.

Clause 42: A computer-implemented method for facilitating content delivery, the computer-implemented method comprising:
under control of a hardware computing device configured with specific computer executable instructions,
obtaining user interaction data associated with a plurality of content requests of a user over a specified period of time;
building a machine learning model for determining above-the-fold (ATF) configurations for Web pages or applications in response to content requests based, at least in part, on the user interaction data;
obtaining a target content request from a user computing device associated with a user;
determining an ATF configuration for a target Web page or application in response to the target content request based, at least in part, on the machine learning model; and
causing the user computing device to render the target Web page or application in response to the target content request in accordance with the determined ATF configuration.

Clause 43: The computer-implemented method of Clause 42, wherein the user interaction data includes at least one of scrolling, dwelling, or clicking action on Web pages or applications, browsing history, searching history, purchase history, product review history, or user location data.

Clause 44: The computer-implemented method of Clauses 42 and 43, wherein the determined ATF configuration corresponds to a configuration for displaying a specific portion of the target Web page or application that is visible without scrolling.

Clause 45: The computer-implemented method of Clauses 42 to 44, wherein the machine learning model is built further based on user computing device data associated with the plurality of content requests.

Clause 46: The computer-implemented method of Clause 45, wherein the user computing device data includes at least one of screen size, screen resolution, browser window size, browser version, or device orientation.

Clause 47: A computer-implemented method comprising:
under control of a hardware computing device configured with specific computer executable instructions,
obtaining a machine learning model for determining above-the-fold (ATF) configurations for rendering responses to content requests;
determining an ATF configuration for rendering a target response on a computing device associated with a user based, at least in part, on the machine learning model, wherein the target response corresponds to a target content request of the user; and
causing the computing device associated with the user to render the target response in accordance with the determined ATF configuration.

Clause 48: The computer-implemented method of Clause 47, wherein the machine learning model is trained on user interaction data associated with at least a second user.

Clause 49: The computer-implemented method of Clauses 47 and 48, wherein determining the ATF configuration for rendering the target response comprises providing the machine learning model with at least one of information regarding the target content request, the user, or the computing device associated with the user.

Clause 50: The computer-implemented method of Clause 47 to 49, wherein determining the ATF configuration for rendering the target response comprises determining a priority of resources embedded in the target response.

Clause 51: The computer-implemented method of Clause 50, wherein the computing device associated with the user retrieves the resources embedded in the target response based, at least in part, on the determined priority.

Clause 52: A system comprising:
a data store configured to at least store computer-executable instructions; and
a hardware processor in communication with the data store, the hardware processor configured to execute the computer-executable instructions to at least:
obtain a machine learning model for determining above-the-fold (ATF) configurations for rendering responses to content requests;
determine an ATF configuration for rendering a target response on a computing device associated with a user based, at least in part, on the machine learning model, wherein the target response corresponds to a target content request of the user; and
cause the computing device associated with the user to render the target response in accordance with the determined ATF configuration.

Clause 53: The system of Clause 52, wherein the machine learning model is trained on historical data regarding content requests over a specified period of time.

Clause 54: The system of Clauses 52 and 53, wherein the hardware processor is further configured to obtain feedback data related to the rendering of the target response in accordance with the determined ATF configuration.

Clause 55: The system of Clause 54, wherein the feedback data includes at least one of scrolling, dwelling, or clicking action with respect to the rendered target response.

Clause 56: The system of Clauses 54 and 55, wherein the machine learning model is updated based, at least in part, on the feedback data.

Clause 57: A non-transitory computer readable storage medium storing computer executable instructions that when executed by a processor perform operations comprising:
  obtaining a machine learning model for determining above-the-fold (ATF) configurations for rendering responses to content requests;
  determining an ATF configuration for rendering a target response on a computing device associated with a user based, at least in part, on the machine learning model, wherein the target response corresponds to a target content request of the user; and
  causing the computing device associated with the user to render the target response in accordance with the determined ATF configuration.

Clause 58: The non-transitory computer-readable storage medium of Clause 57, wherein the machine learning model corresponds to a decision tree model or an artificial neural network model.

Clause 59: The non-transitory computer-readable storage medium of Clauses 57 and 58, wherein the target response corresponds to a Web page or application.

Clause 60: The non-transitory computer-readable storage medium of Clauses 57 to 59, wherein determining the ATF configuration for rendering the target response comprises providing the machine learning model with at least one of information regarding the target content request, the user, or the computing device associated with the user.

Clause 61: The non-transitory computer-readable storage medium of Clauses 57 to 60, wherein determining the ATF configuration for rendering the target response comprises determining an order for the computing device associated with the user to render content embedded in the target response.

Clause 62: The non-transitory computer-readable storage medium of Clauses 57 to 61, wherein determining the ATF configuration comprises predicting a portion of the target response that the user intends to perceive.

Clause 63: A computer-implemented method for facilitating content delivery, the computer-implemented method comprising:
  under control of a hardware computing device configured with specific computer executable instructions,
    building a machine learning model for predicting content delivery performance based, at least in part, on historical data related to content requests over a specified period of time;
    providing a first portion of the machine learning model to a user computing device;
    obtaining a target content request from the user computing device, wherein the target content request includes information generated by the first portion of the machine learning model executing on the user computing device;
    determining a predicted content delivery performance for applying a target content delivery strategy in response to the target content request based, at least in part, on a second portion of the machine learning model; and
    if the predicted content delivery performance satisfies a predetermined condition:
      generating a response to the target content request in accordance with the target content delivery strategy; and
      transmitting the generated response to the user computing device.

Clause 64: The computer-implemented method of Clause 63, wherein the first portion of the machine learning model is trained on the user computing device.

Clause 65: The computer-implemented method of Clauses 63 and 64, wherein determining the predicted content delivery performance comprises providing the information generated by the first portion of the machine learning model into the second portion of the machine learning model.

Clause 66: The computer-implemented method of Clauses 63 to 65, wherein the first portion of the machine learning model receives input data from the user computing device.

Clause 67: The computer-implemented method of Clause 66, wherein at least one portion of the input data is derived from information accessible exclusively to the user computing device.

Clause 68: A computer-implemented method comprising:
  under control of a hardware computing device configured with specific computer executable instructions,
    obtaining a machine learning model for facilitating content delivery in response to content requests;
    causing a first portion of the machine learning model to be provided to a user computing device;
    determining a first content delivery strategy in response to a first content request submitted by the user computing device based, at least in part, on the first portion of the machine learning model executing on the user computing device; and
    implementing the first content delivery strategy in response to the first content request.

Clause 69: The computer-implemented method of Clause 68 further comprising updating the first portion of the machine learning model based, at least in part, on content delivery performance data related to the implementation of the first delivery strategy.

Clause 70: The computer-implemented method of Clause 69 further comprising causing the updated first portion of the machine learning model to be provided to the user computing device.

Clause 71: The computer-implemented method of Clause 70 further comprising determining a second content delivery strategy in response to a second content request submitted by the user computing device based, at least in part, on the updated first portion of the machine learning model executing on the user computing device.

Clause 72: The computer-implemented method of Clauses 68 to 71, wherein the machine learning model corresponds to a decision tree model or an artificial neural network model.

Clause 73: A system comprising:
  a data store configured to at least store computer-executable instructions; and
  a hardware processor in communication with the data store, the hardware processor configured to execute the computer-executable instructions to at least:
    obtain a machine learning model for facilitating content delivery in response to content requests;

cause a first portion of the machine learning model to be provided to a user computing device;

determine a first content delivery strategy in response to a first content request submitted by the user computing device based, at least in part, on the first portion of the machine learning model executing on the user computing device; and implement the first content delivery strategy in response to the first content request.

Clause 74: The system of Clause 73, wherein the hardware processor is further configured to cause a second portion of the machine learning model to be provided to the user computing device.

Clause 75: The system of Clause 74, wherein the second portion of the machine learning model is determined based, at least in part, on information related to the first content request.

Clause 76: The system of Clauses 74 and 75, wherein the hardware processor is further configured to determine a second content delivery strategy in response to a second content request submitted by the user computing device based, at least in part, on the second portion of the machine learning model executing on the user computing device.

Clause 77: The system of Clauses 74 to 76, wherein the implementation of the first content delivery strategy includes causing the second portion of the machine learning model to be provided to the user computing device machine.

Clause 78: A non-transitory computer readable storage medium storing computer executable instructions that when executed by a processor perform operations comprising:

obtaining a machine learning model for facilitating content delivery in response to content requests;

causing a first portion of the machine learning model to be provided to a first user computing device;

determining a first content delivery strategy in response to a first content request submitted by the first user computing device based, at least in part, on the first portion of the machine learning model executing on the first user computing device; and implementing the first content delivery strategy in response to the first content request.

Clause 79: The non-transitory computer-readable storage medium of Clause 78, wherein the operations further comprise causing a second portion of the machine learning model to be provided to a second user computing device.

Clause 80: The non-transitory computer-readable storage medium of Clause 79, wherein the first portion of the machine learning model includes the second portion.

Clause 81: The non-transitory computer-readable storage medium of Clauses 78 to 80, wherein the operations further comprise obtaining updates to the machine learning model.

Clause 82: The non-transitory computer-readable storage medium of Clauses 78 to 81, wherein the operations further comprises causing updates to the first portion of the machine learning model to be provided to the first user computing device.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:

under control of a hardware computing device configured with specific computer executable instructions, obtaining a request for a first network resource;

determining that the request corresponds to a first cluster of content requests associated with a first content serving computing device based on a clustering criterion, wherein content requests in the first cluster include one or more requests for at least a second network resource different than the first network resource;

routing the request to the first content serving computing device;

obtaining a metric that measures cache performance associated with the request, wherein the metric comprises a weighted average of a cache hit rate of a cache component of the first content serving computing device and a latency of content delivery in response to the request;

updating the clustering criterion using at least the obtained metric that measures cache performance;
updating the first cluster of content requests using the updated clustering criterion; and
re-associating the first content serving computing device with the updated first cluster of content requests.

2. The computer-implemented method of claim 1, wherein the metric comprises an indication that the first cluster corresponds to a first cache performance level and an indication that a second cluster associated with a second content serving computing device corresponds to a second cache performance level higher than the first cache performance level.

3. The computer-implemented method of claim 2, wherein updating the clustering criterion further comprises:
determining features of the first content request and other content requests that contribute to the first cluster corresponding to the first cache performance level; and
updating the clustering criterion based on the determined features.

4. The computer-implemented method of claim 3, wherein updating the clustering criterion based on the determined features further comprises updating the clustering criterion to discount the determined features.

5. The computer-implemented method of claim 1, wherein updating the clustering criterion further comprises updating the clustering criterion periodically.

6. The computer-implemented method of claim 1, wherein updating the clustering criterion further comprises updating the clustering criterion based on a condition.

7. The computer-implemented method of claim 6, wherein the condition comprises the metric falling below a threshold value.

8. A system comprising:
a data store configured to at least store computer-executable instructions; and
a hardware processor in communication with the data store, the hardware processor configured to execute the computer-executable instructions to at least:
determine that a request for a first network resource corresponds to a first group of content requests associated with a first content serving computing device based on a grouping criterion, wherein a first content request in the first group of content requests includes a request for a second network resource different than the first network resource;
route the request to the first content serving computing device;
obtain a metric that measures cache performance associated with the request, wherein the metric comprises a weighted average of a cache hit rate of a cache component of the first content serving computing device and a latency of content delivery in response to the request;
update the grouping criterion using at least the obtained metric that measures cache performance;
update the first group of content requests using the updated grouping criterion; and
re-associate the first content serving computing device with the updated first group of content requests.

9. The system of claim 8, wherein the metric comprises an indication that the first group corresponds to a first cache performance level and an indication that a second group associated with a second content serving computing device corresponds to a second cache performance level higher than the first cache performance level.

10. The system of claim 9, wherein the hardware processor is further configured to:
determine features of the first content request and other content requests that contribute to the first group corresponding to the first cache performance level; and
update the grouping criterion based on the determined features.

11. The system of claim 10, wherein the hardware processor is further configured to update the grouping criterion to discount the determined features.

12. The system of claim 8, wherein the hardware processor is further configured to update the grouping criterion periodically.

13. The system of claim 8, wherein the hardware processor is further configured to update the grouping criterion based on a condition.

14. The system of claim 13, wherein the condition comprises the metric falling below a threshold value.

15. The system of claim 8, wherein the first content serving computing device achieves better cache performance when associated with the updated first group than when associated with the first group.

16. A non-transitory computer-readable storage medium storing computer executable instructions that when executed by a processor perform operations comprising:
determining that a request for a first network resource corresponds to a first group of content requests associated with a first content serving computing device based on a criterion, wherein a first content request in the first group of content requests includes a request for a second network resource different than the first network resource;
routing the request to the first content serving computing device;
obtaining a metric that measures cache performance associated with the request, wherein the metric comprises a weighted average of a cache hit rate of a cache component of the first content serving computing device and a latency of content delivery in response to the request;
updating the criterion using at least the obtained metric that measures cache performance;
updating the first group of content requests using the updated criterion; and
re-associating the first content serving computing device with the updated first group of content requests.

17. The non-transitory computer-readable storage medium of claim 16, wherein the metric comprises an indication that the first group corresponds to a first cache performance level and an indication that a second group associated with a second content serving computing device corresponds to a second cache performance level higher than the first cache performance level.

18. The non-transitory computer-readable storage medium of claim 17, wherein the operations further comprise:
determining features of the first content request and other content requests that contribute to the first group corresponding to the first cache performance level; and
updating the grouping criterion based on the determined features.

19. The non-transitory computer-readable storage medium of claim 18, wherein the operations further comprise updating the grouping criterion to discount the determined features.

20. The non-transitory computer-readable storage medium of claim 16, wherein the first content serving computing device achieves better cache performance when associated with the updated first group than when associated with the first group.

* * * * *